(12) United States Patent
Kondo et al.

(10) Patent No.: US 9,900,240 B2
(45) Date of Patent: Feb. 20, 2018

(54) ROUTE SELECTING METHOD AND NODE APPARATUS

(71) Applicant: FUJITSU LIMITED, Kawasaki-shi, Kanagawa (JP)

(72) Inventors: Taiji Kondo, Chiba (JP); Hiroshi Towata, Fukuoka (JP); Eizou Ishizu, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 14/632,501

(22) Filed: Feb. 26, 2015

(65) Prior Publication Data

US 2015/0271053 A1    Sep. 24, 2015

(30) Foreign Application Priority Data

Mar. 19, 2014 (JP) ................................. 2014-057265

(51) Int. Cl.
*H04L 12/721* (2013.01)
*H04L 12/751* (2013.01)
*H04L 12/851* (2013.01)
*H04W 28/02* (2009.01)

(52) U.S. Cl.
CPC .......... *H04L 45/123* (2013.01); *H04L 45/026* (2013.01); *H04L 45/124* (2013.01)

(58) Field of Classification Search
CPC ............................. H04L 45/124; H04W 40/14
See application file for complete search history.

(56) References Cited

U.S. PATENT DOCUMENTS

| | | | |
|---|---|---|---|
| 2010/0067398 A1* | 3/2010 | Kutschenreuter | H04L 45/124 370/252 |
| 2010/0074194 A1 | 3/2010 | Liu et al. | |
| 2010/0161275 A1* | 6/2010 | Mousavi | G06Q 10/06 702/179 |
| 2010/0195560 A1* | 8/2010 | Nozaki | H04B 7/2606 370/315 |
| 2012/0099587 A1 | 4/2012 | Fan et al. | |

FOREIGN PATENT DOCUMENTS

| | | | | |
|---|---|---|---|---|
| JP | 2010-518745 | 5/2010 | | |
| JP | 2010-178145 | 8/2010 | | |
| JP | 2012-105258 | 5/2012 | | |
| WO | WO 2008/097221 A1 | 8/2008 | | |
| WO | WO 2008097221 A1 * | 8/2008 | ........... | H04L 45/124 |

\* cited by examiner

*Primary Examiner* — Yemane Mesfin
*Assistant Examiner* — Henry Baron
(74) *Attorney, Agent, or Firm* — Staas & Halsey LLP

(57) ABSTRACT

A node apparatus calculates the arrival rate in a link, discretizes the calculated arrival rate according to thresholds that are set so that the intervals between thresholds in the range in which a large number of the arrival rates in the links with a high frequency of usage exist become narrower, and calculates the link cost according to the value after the discretization. The node apparatus then obtains, from adjacent node apparatuses, the route cost for each route to each final destination that may be reached, and integrates the obtained route cost by the calculated link cost to calculate the route cost to each final destination that can be reached from the local node apparatus via the adjacent node apparatus. The node apparatus then selects the adjacent node apparatus to be the transmission destination according to the route cost of the route to the final destination of a data frame.

11 Claims, 30 Drawing Sheets

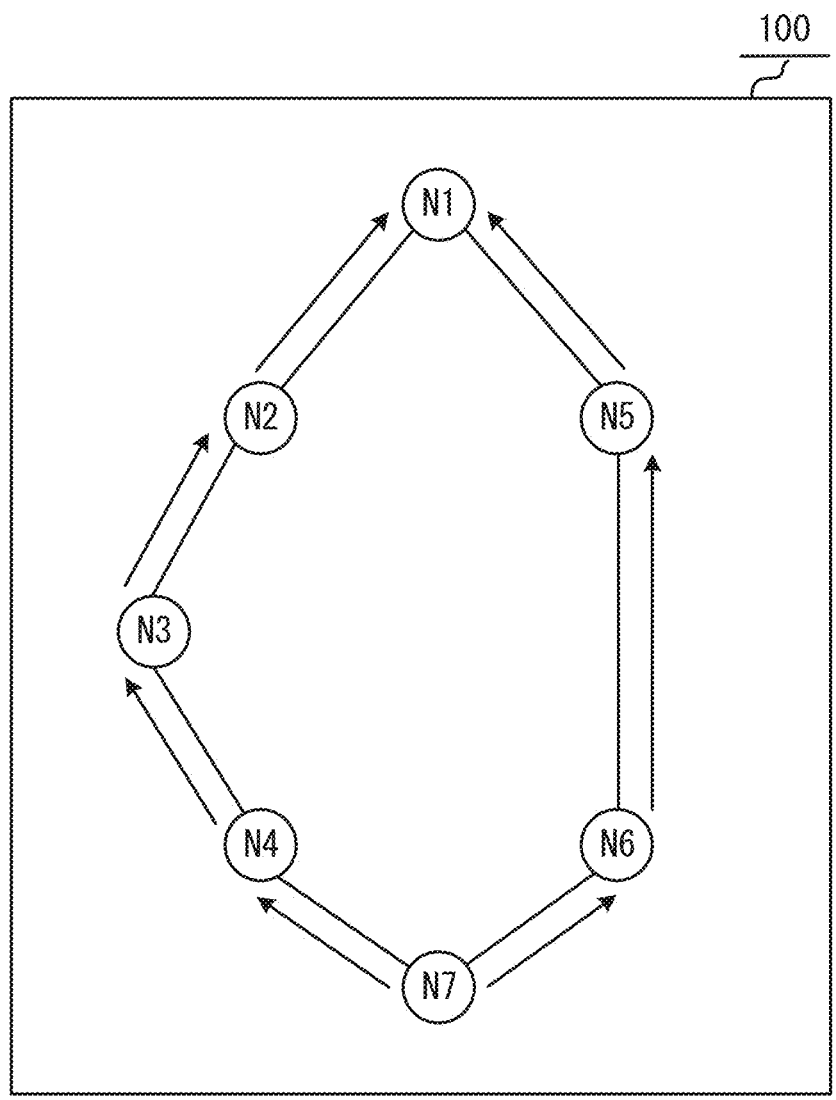
F I G. 1

| LD | LS | GD | GS | FID | FRAME TYPE |

FIG. 4

| FIELD NAME | INFORMATION STORED |
|---|---|
| LD | NODE ID OF ADJACENT NODE APPARATUS TO BE TRANSMISSION DESTINATION |
| LS | NODE ID OF ADJACENT NODE APPARATUS TO BE TRANSMISSION SOURCE |
| GD | NODE ID OF NODE APPARATUS TO BE FINAL DESTINATION |
| GS | NODE ID OF NODE APPARATUS WHICH IS ISSUING SOURCE OF FRAME |
| FID | FRAME ID IN NODE APPARATUS WHICH IS ISSUING SOURCE OF FRAME |
| FRAME TYPE | INFORMATION INDICATING TYPE OF FRAME |

F I G. 5

| TRANSMISSION-SOURCE ID | FID | FRAME TYPE | (GD1, ROUTE COST), (GD2, ROUTE COST), ..... |
|---|---|---|---|

FIG. 6

| FIELD NAME | INFORMATION STORED |
|---|---|
| TRANSMISSION-SOURCE ID | NODE ID OF NODE APPARATUS WHICH IS TRANSMISSION SOURCE OF FRAME |
| FID | FRAME ID IN NODE APPARATUS WHICH IS TRANSMISSION SOURCE OF FRAME |
| FRAME TYPE | INFORMATION INDICATING TYPE OF FRAME |
| PAIRS OF GD AND ROUTE COST | PAIRS OF NODE ID OF GD THAT MAY BE REACHED FROM TRANSMISSION-SOURCE NODE APPARATUS AND MINIMUM ROUTE COST AMONG ROUTES FROM CORRESPONDING GD TO TRANSMISSION-SOURCE NODE APPARATUS |

FIG. 7

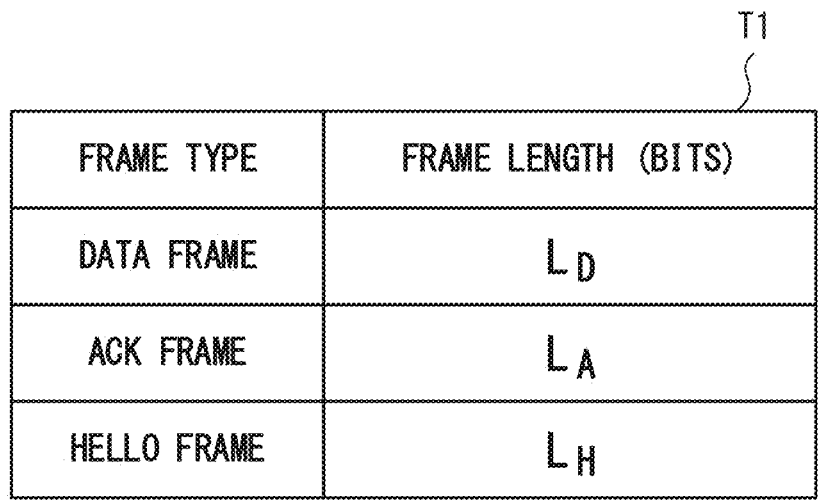
F I G. 8

| ADJACENT NODE APPARATUS | NUMBER OF RECEPTIONS |
|---|---|
| N4 | RC4 |
| N6 | RC6 |
| ⋮ | ⋮ |

| GD | ADJACENT NODE APPARATUS | LINK COST | ROUTE COST |
|---|---|---|---|
| ... | ... | ... | ... |
| N1 | N4 | $C_{Link}(N4, N7)$ | $C_{Route}(N1, \cdots, N4, N7)$ |
| | N6 | $C_{Link}(N6, N7)$ | $C_{Route}(N1, \cdots, N6, N7)$ |
| ... | ... | ... | ... |

T4

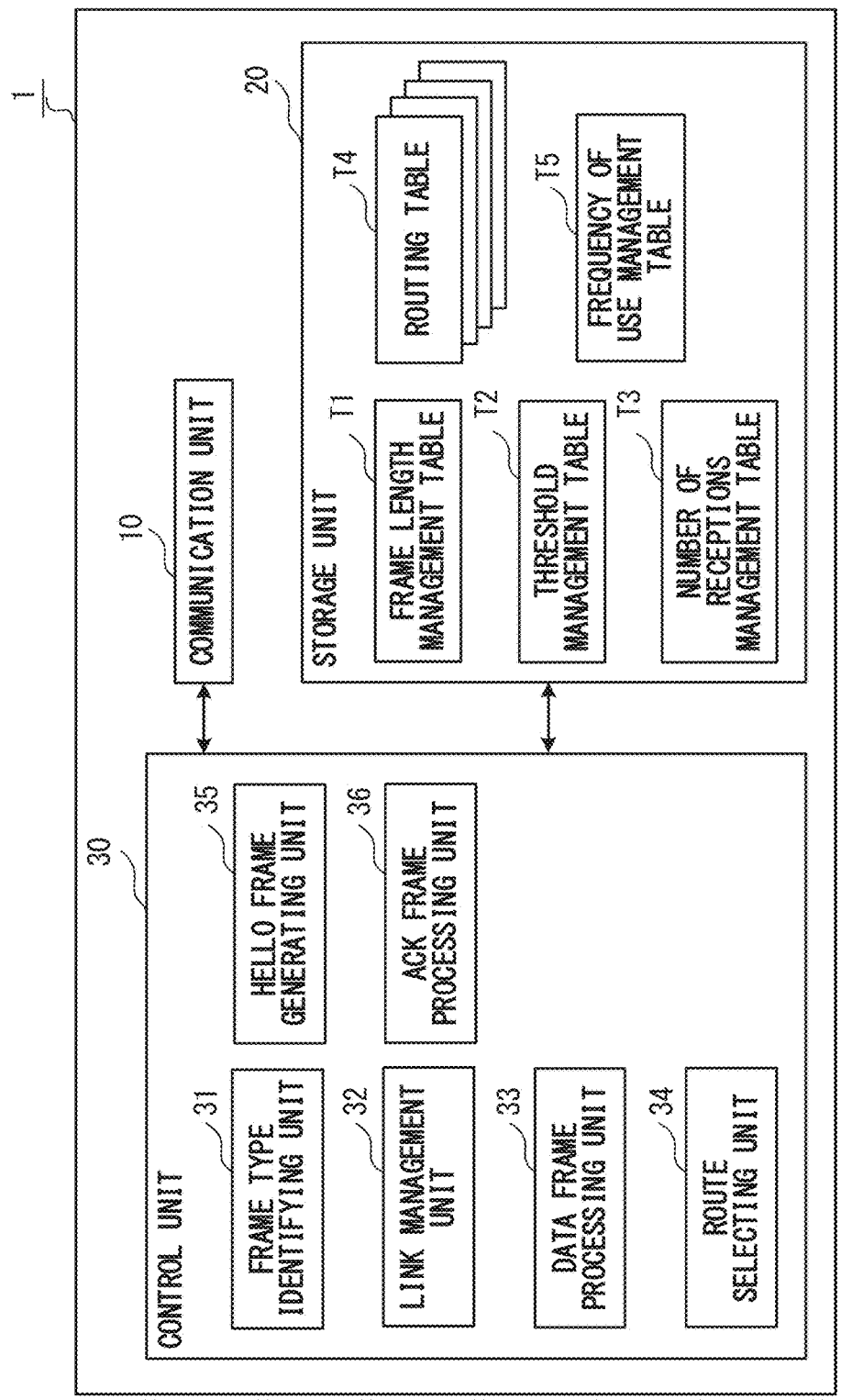
F I G. 17

| TRANSMISSION-SOURCE ID | FID | FRAME TYPE | (GD1, ROUTE COST), (GD2, ROUTE COST), .... | THRESHOLDS Sk |

FIG. 20

| FIELD NAME | INFORMATION STORED |
|---|---|
| TRANSMISSION-SOURCE ID | NODE ID OF NODE APPARATUS WHICH IS TRANSMISSION SOURCE OF FRAME |
| FID | FRAME ID IN NODE APPARATUS WHICH IS TRANSMISSION SOURCE OF FRAME |
| FRAME TYPE | INFORMATION INDICATING TYPE OF FRAME |
| PAIRS OF GD AND ROUTE COST | PAIRS OF NODE ID OF GD THAT MAY BE REACHED FROM TRANSMISSION-SOURCE NODE APPARATUS AND MINIMUM ROUTE COST AMONG ROUTES FROM CORRESPONDING GD TO TRANSMISSION-SOURCE NODE APPARATUS |
| THRESHOLDS Sk | NEWLY CALCULATED THRESHOLDS Sk |

FIG. 21

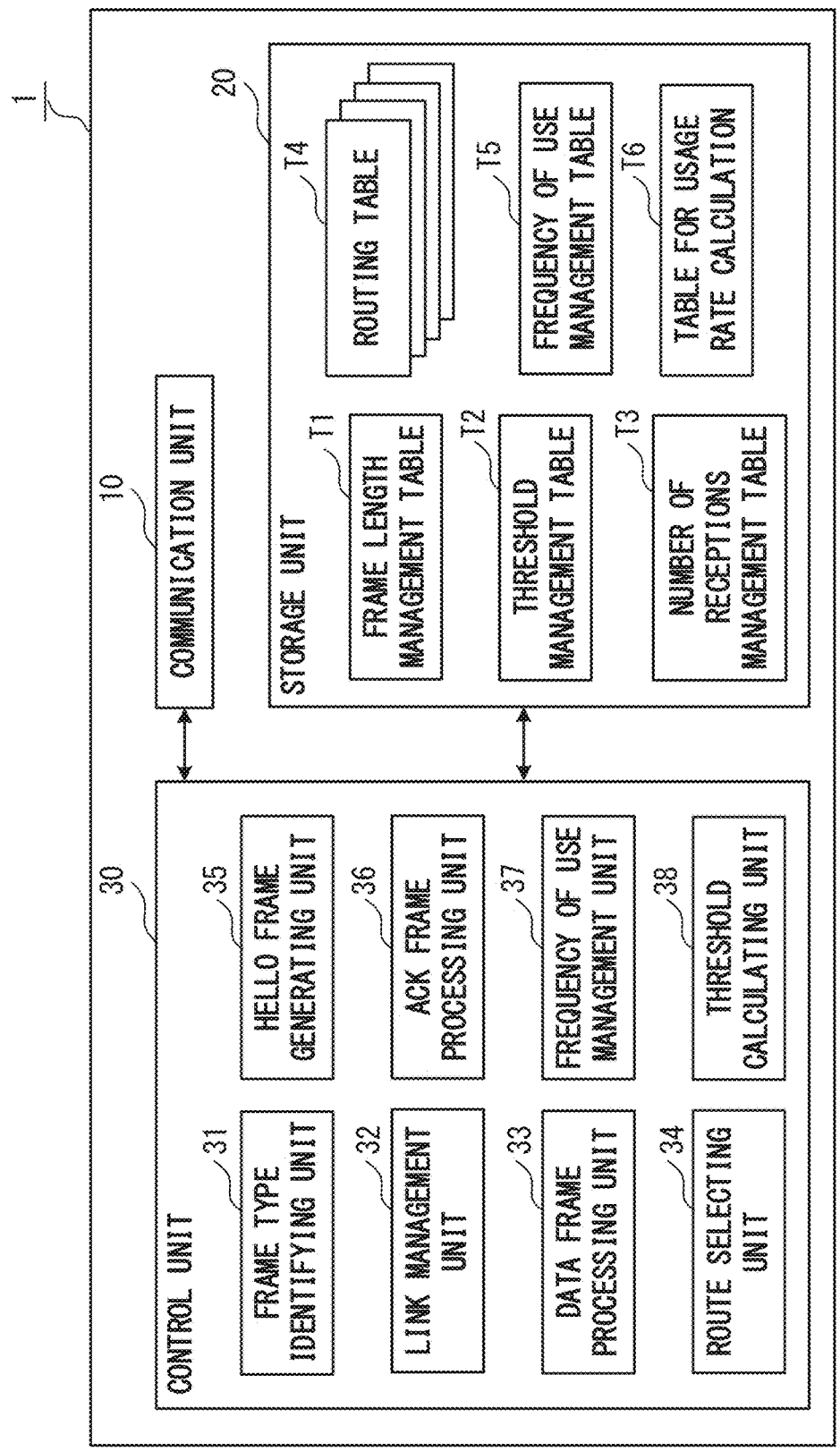
F I G. 22

| ARRIVAL RATE i | FREQUENCY OF USE FU(i) | USAGE RATE UR(i) |
|---|---|---|
| ⋮ | ⋮ | ⋮ |

F I G. 2 3

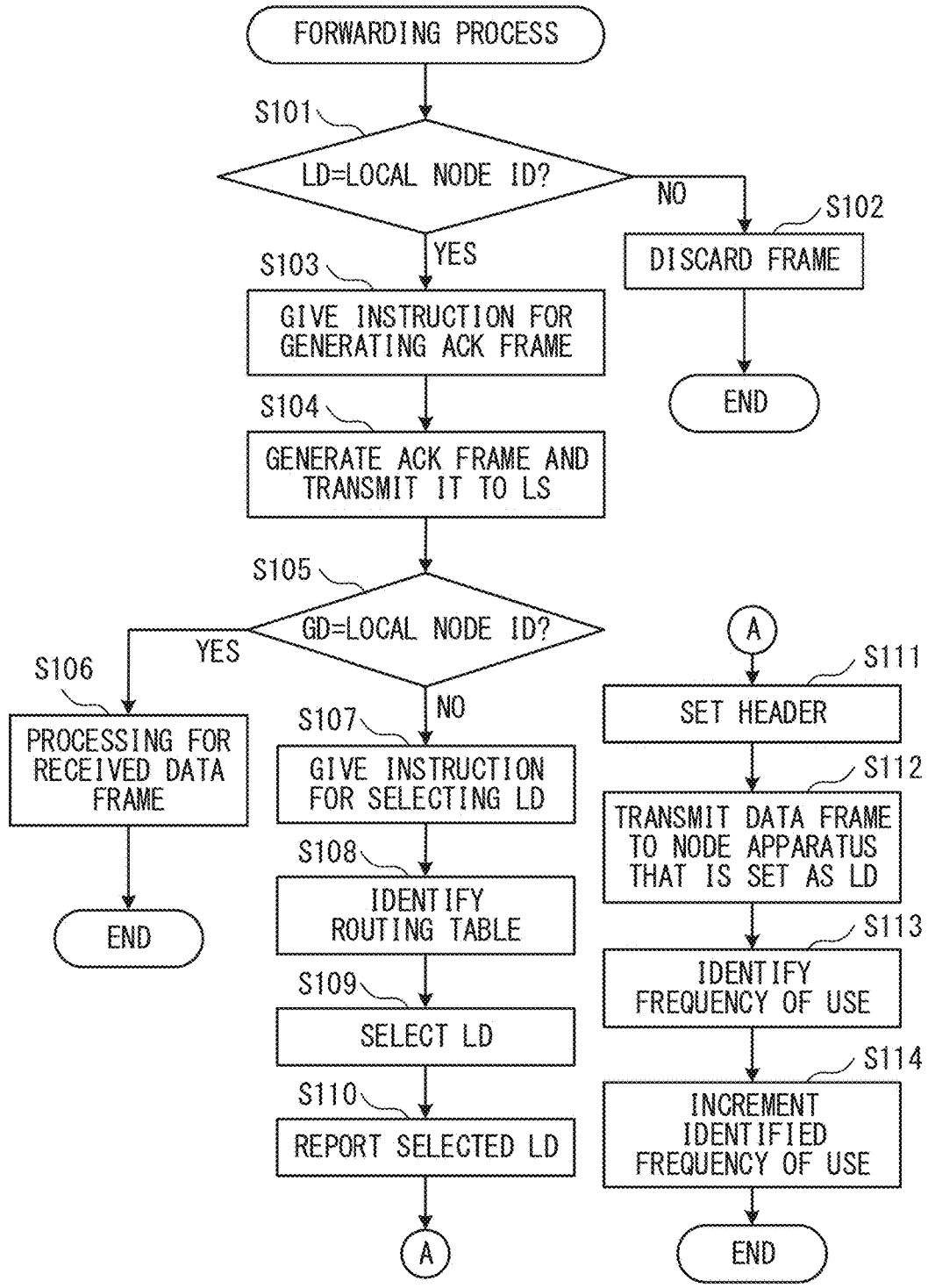
F I G. 24

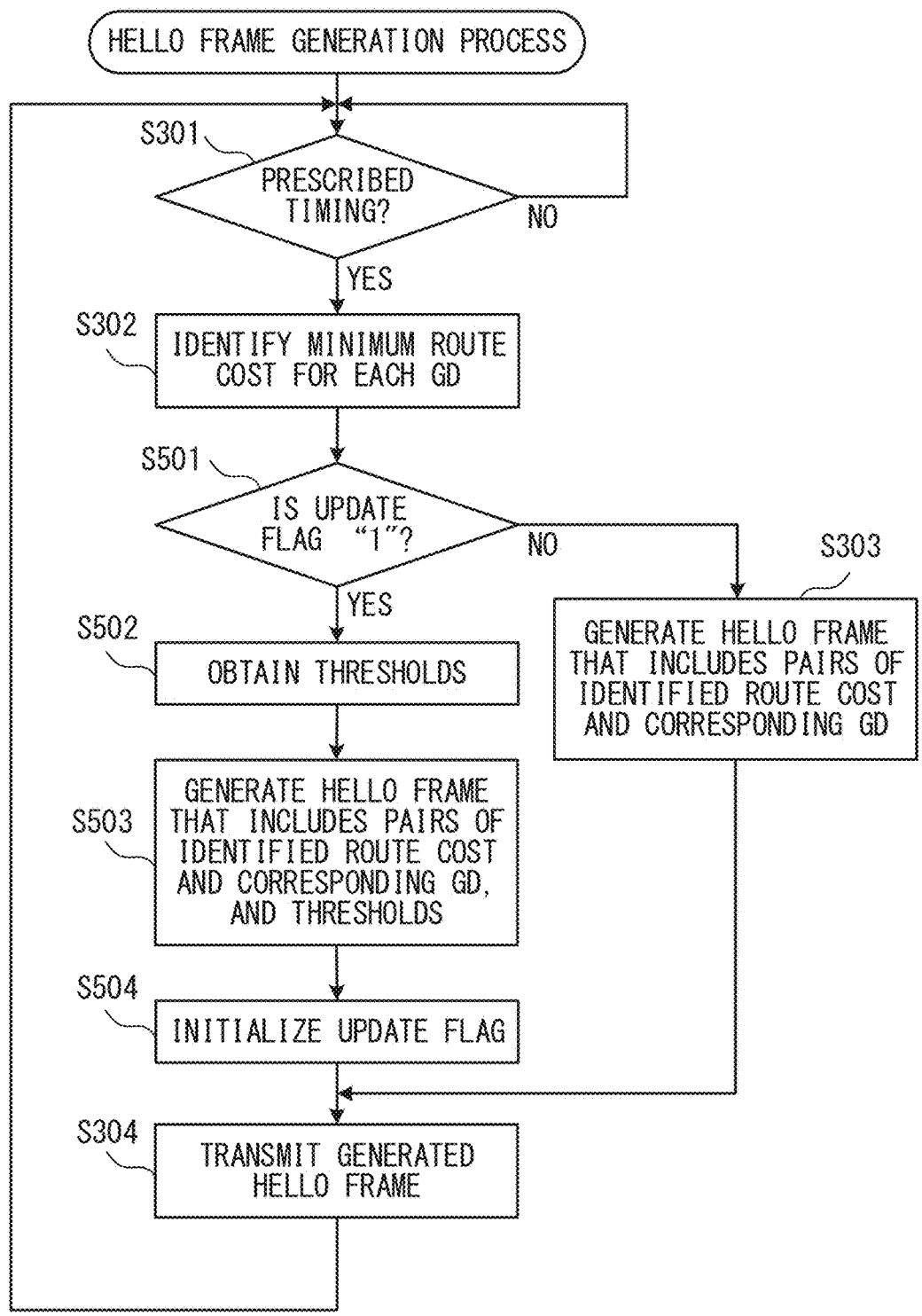
F I G. 27

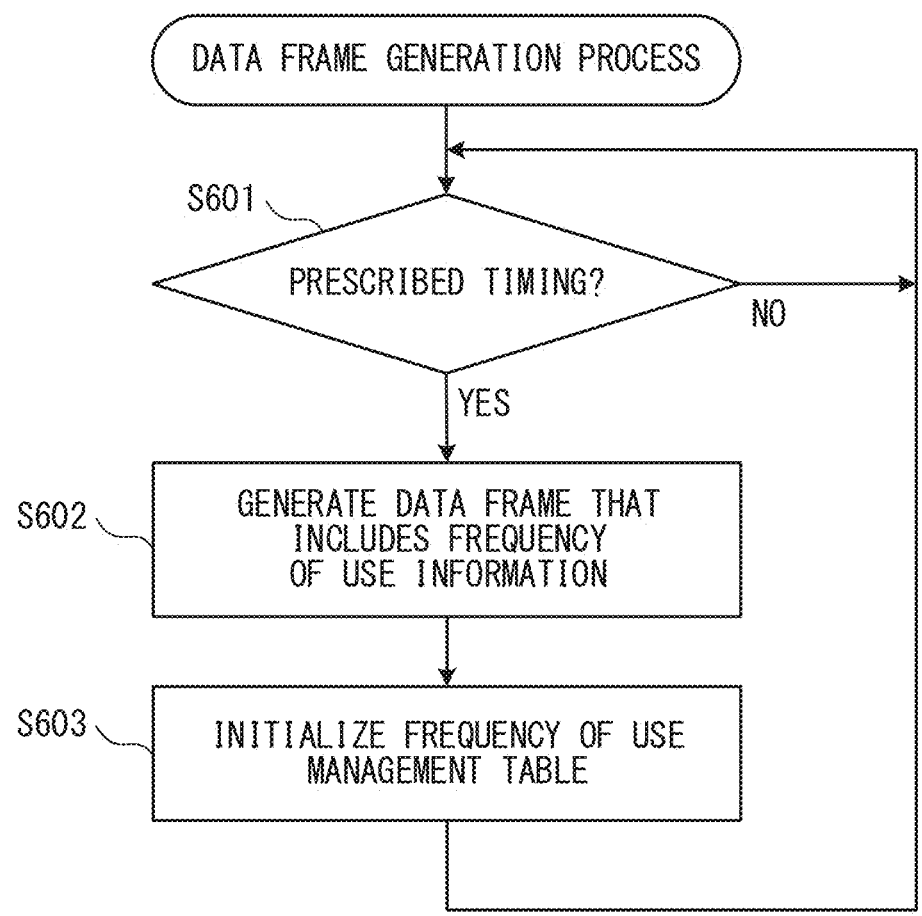
F I G. 28

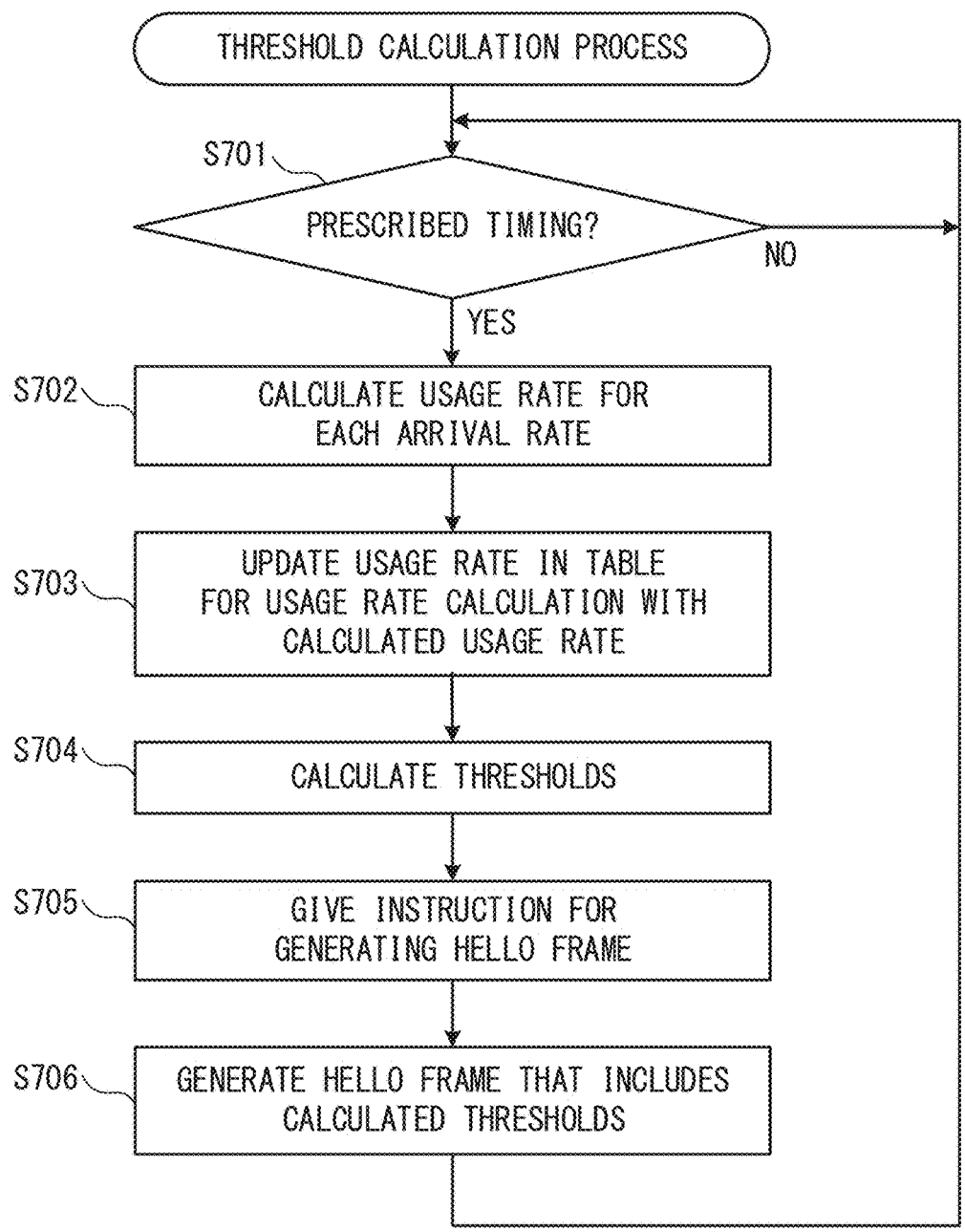
F I G. 29

ROUTE SELECTING METHOD AND NODE APPARATUS

CROSS-REFERENCE TO RELATED APPLICATION

This application is based upon and claims the benefit of priority of the prior Japanese Patent Application No. 2014-057265, filed on Mar. 19, 2014, the entire contents of which are incorporated herein by reference.

FIELD

The present invention relates to a route selecting method and a node apparatus.

BACKGROUND

In recent years, studies have been conducted about an ad hoc network in which a plurality of communication apparatuses (hereinafter, referred to as node apparatuses) are mutually connected in an autonomously-distributed manner. Each node apparatus in an ad hoc network autonomously establishes a network according to the communication environment.

Specifically, in an ad hoc network, no access points are provided, and each node apparatus relays a data frame received from a node apparatus that is adjacent to it (hereinafter, referred to as an adjacent node apparatus) to another adjacent apparatus according to the network topology, to deliver the data frame to the apparatus which is the final destination (hereinafter, referred to as the final destination apparatus) such as a gateway apparatus (hereinafter, referred to as a GW apparatus).

At this time, each node apparatus selects a route according to a route cost $C_{Route}$ and transmits the data frame. That is, when there are a plurality of routes to the final destination apparatus, selection of a route by each node apparatus depends on the definition of the route cost $C_{Route}$.

When there is a change in the quality of a link (hereinafter, referred to as the link quality) on a route and the route is changed, a loop route may appear in some cases. A loop route is eliminated when a Hello frame is propagated and the deterioration in the link quality is reported to each node apparatus.

As described above, a loop route in an ad hoc network appears with a change of the route as a trigger, and is eliminated when a Hello frame is propagated and a route is formed again.

However, in an environment with large fluctuations in the link quality, route changes occur frequently. In this case, many loop routes appear because Hello frame propagation fails to keep pace, resulting in a deterioration in the arrival rate.

As a solution to this problem, there is, for example, a method for suppressing the frequency of changes in the route cost $C_{Route}$ due to changes in the link quality by discretizing link costs which constitute the basis of the route cost $C_{Route}$ (see Patent Document 1, for example). By suppressing the frequency of changes in the route cost $C_{Route}$, route changes are suppressed, and as a result, it becomes possible to suppress the occurrence of loop routes.

Patent Document 1: Japanese National Publication of International Patent Application No. 2010-518745

SUMMARY

In an aspect, a route selecting method includes calculating by a processor an arrival rate which is a value obtained by multiplying reception rates in both directions in a link with an adjacent node apparatus which is anode apparatus adjacent to the node apparatus; discretizing by the processor the calculated arrival rate according to a plurality of thresholds set in advance; calculating by the processor a link cost in the link with the adjacent node apparatus according to a value after discretization of the arrival rate; obtaining by the processor, from the adjacent node apparatus, a route cost which is an integrated value of link costs of links on a route, for each route to each final-destination node apparatus that may be reached from the adjacent node apparatus; calculating by the processor a route cost in a route to each final-destination node apparatus that may be reached from the local node apparatus via the adjacent node apparatus by integrating the obtained route cost by the calculated link cost; and when transmitting a data frame, selecting by the processor the adjacent node apparatus to be a transmission destination of the data frame which is a transmission object according to the route cost of a route from the local node apparatus to a node apparatus which is a final destination of the data frame which is the transmission object, wherein the thresholds are set so that intervals between the thresholds in an area in which a large number of the arrival rates in the links with a high frequency of usage exist become narrower compared with intervals in other ranges.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a part of a configuration example of a network in embodiment 1.

FIG. 4 illustrates a format example for a header of a data frame in embodiment 1.

FIG. 5 gives a description of each field in the format example illustrated in FIG. 4.

FIG. 6 illustrates a format example for a header of a Hello frame in embodiment 1.

FIG. 7 gives a description of each field in the format example illustrated in FIG. 6.

FIG. 8 illustrates an example of a frame length management table in embodiment 1.

FIG. 10 illustrates an example of a number of receptions management table in embodiment 1.

FIG. 11 illustrates an example of a routing table in embodiment 1.

FIG. 17 is a block diagram illustrating a configuration example of a node apparatus which constitute a network in embodiment 2.

FIG. 20 illustrates a format example for a header of a Hello frame in embodiment 2.

FIG. 21 gives a description of each field in the format example illustrated in FIG. 20.

FIG. 22 is a functional block diagram illustrating a configuration example of a node apparatus that functions as a GW apparatus in embodiment 2.

FIG. 23 illustrates an example of a table for usage rate calculation in embodiment 2.

FIG. 24 is an example of a flowchart for explaining the flow in a forwarding process in embodiment 2.

FIG. 27 is an example of a flowchart for explaining the flow in a Hello frame generation process in embodiment 2.

FIG. 28 is an example of a flowchart for explaining the flow in a data frame generation process in embodiment 2.

FIG. 29 is an example of a flowchart for explaining the flow in a threshold calculation process executed in a GW apparatus in embodiment 2.

DESCRIPTION OF EMBODIMENTS

Figure 2:
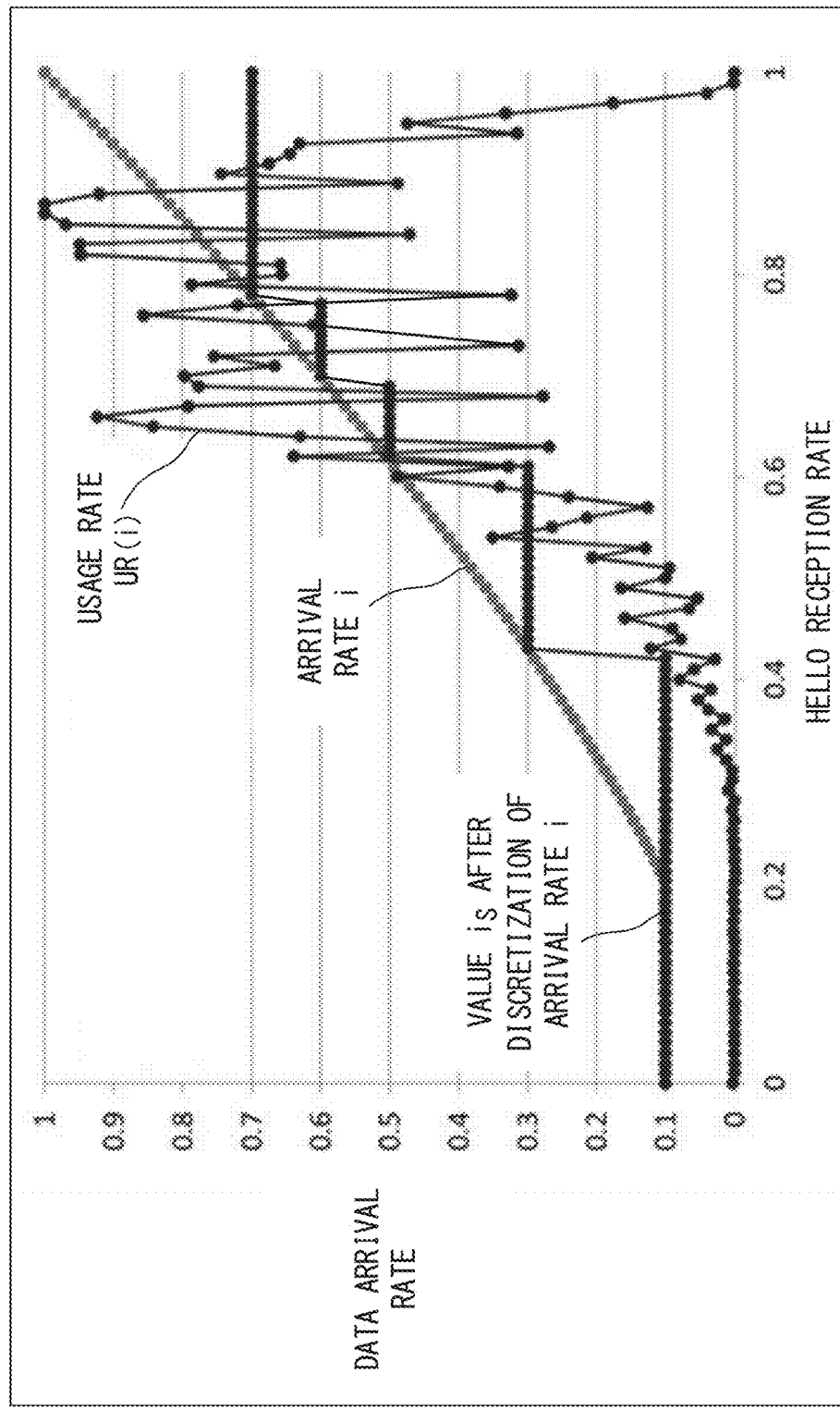
FIG. 2 is an example in which arrival rates with respect to a reception rate of Hello frames, a value after discretization of the arrival rate, and a usage rate of links with respect to the reception rate of Hello frames are respectively expressed in a graph.

Hereinafter, embodiments of the present invention are described in detail with reference to the drawings.

Embodiment 1 is explained below.

FIG. 1 illustrates a part of a configuration example of a network 100 in embodiment 1. The network 100 is an example of an ad hoc network and includes a plurality of node apparatuses 1. There are links between node apparatuses 1, and the links are indicated by solid lines in FIG. 1.

The node apparatus 1 is, for example, a metering node apparatus such as a power meter or a sensor node apparatus equipped with a sensor of various types, or the like. When the node apparatus 1 is a sensor node apparatus, the node apparatus 1 collects information from the sensor or the like, according to an order from a data server or autonomously and transmits the collected information (a data frame) to the data server.

In FIG. 1, the node apparatus 1 is presented as "Ni" (i=1, ..., 7). "Ni" is a node ID (IDentification) with which the node apparatus 1 may be uniquely identified, and is, for example, the address of the node apparatus 1. Hereinafter, when referring to a particular node apparatus 1, for example, when referring to the node apparatus 1 whose node ID is Ni, it is referred to as the node apparatus Ni. The node apparatus N1 in FIG. 1 is assumed to be a GW apparatus.

A link may be either a wireless link or a wired link. For example, referring to FIG. 1, when it is possible for the node apparatus N1 and a node apparatus N2 to communicate directly without relaying by another node apparatus 1, this is expressed as "a link exists between the node apparatus N1 and the node apparatus N2".

A link changes dynamically, and a new link may be established between the node apparatuses 1 due to the influence of the weather or a shielding object, or a link that has been established may disappear, for example. In addition, when the node apparatuses 1 are mobile for example, presence/absence of a link may change according to fluctuation in the distance between the node apparatuses 1. In addition, for example, a change in cable connection may also cause a new link to be established or a link that has existed to disappear, or a link may disappear due to a failure such as disconnection of a cable.

Next, an algorithm used for calculating a link cost $C_{Link}$ in embodiment 1 is explained. In this algorithm, an arrival rate i of unicast frames which is described in detail later is discretized according to thresholds Sk (k=1, 2, ..., K) calculated using a method explained below, and the reciprocal of a value $i_S$ after the discretization of the arrival rate i is obtained as the link cost $C_{Link}$.

First, the calculation method for the thresholds Sk is explained. The thresholds Sk are thresholds which are optimized so as to minimize an estimated metric $M_E$ defined as in Formula 1 below. That is, the thresholds Sk are optimized so as to minimize error generated due to discretization of the arrival rate i in the overall system, in view of the probability of existence (probability distribution) of the arrival rate i for the actually-used links.

$$M_E = \sum_{i \in I} \{(SCORE_S(i) - SCORE(i)) \times UR(i)\} \quad \text{[Formula 1]}$$

Here, SCORE(i), $SCORE_S(i)$, UR(i), and I in the formula 1 are respectively defined as follows. While not a limitation, it is assumed here that when i<0.1, SCORE(i)=$SCORE_S$(i)=10.

SCORE(i): The reciprocal of the arrival rate i (1/i)

$SCORE_S(i)$: The reciprocal of the value $i_S$ after the arrival rate i is discretized according to the thresholds Sk UR(i): The usage rate of the link of the arrival rate i in the network 100, that is, assuming the arrival rate i to be a random variable, the probability of the value of the random variable being i I: A set consisting of the arrival rates i The discretization of the arrival rate i according to the thresholds Sk is performed using Formula 2 below, for example. Here, Sk<Sk+1 is assumed.

$$i_S = \begin{cases} 0.1 & \text{if } i < S1 \\ S1 & \text{if } S1 \leq i < S2 \\ S2 & \text{if } S2 \leq i < S3 \\ \vdots \\ SK & \text{if } SK \leq i < i \end{cases} \quad \text{[Formula 2]}$$

Here, the link cost $C_{Link}$ in embodiment 1 is defined as in Formula 3 below. That is, the reciprocal of the value $i_S$ after discretization of the arrival rate i in the link using Formula 2 according to the thresholds Sk which are optimized so as to minimize the estimated metric $M_E$, that is, $SCORE_S$ (i) with the thresholds Sk in a case in which they are optimized so as to minimize the estimated metric $M_E$, is defined as the link cost $C_{Link}$.

$$(\text{LINK COST } C_{Link}) = \begin{pmatrix} \text{SCORES}(i) \text{ WITH THRESHOLDS } Sk \text{ IN A CASE WHERE THEY ARE} \\ \text{OPTIMIZED SO AS TO MINIMIZE THE ESTIMATED METRIC } M_E \end{pmatrix} \quad \text{[Formula 3]}$$

Meanwhile, the route cost $C_{Route}$ in embodiment 1 is defined as in Formula 4 below. That is, the route cost $C_{Route}$ is defined as the integrated value of the link costs $C_{Link}$ of the respective links on the route.

$$(\text{ROUTE COST } C_{Route}) = \begin{pmatrix} \text{INTEGRATED VALUE OF LINK COSTS } C_{Link} \text{ OF} \\ \text{THE RESPECTIVE LINKS ON THE ROUTE} \end{pmatrix} \quad \text{[Formula 4]}$$

In this case, referring to FIG. 1, the route cost $C_{Route}$ (N7, N6, N5, N1) of the route (N7, N6, N5, N1) may be expressed as in Formula 5, and the route cost $C_{Route}$ (N7, N4, N3, N2, N1) of the route (N7, N4, N3, N2, N1) may be expressed as in Formula 6, respectively. Also, it is assumed that the link cost $C_{Link}$ in the link Ni-Nj is expressed as link cost $C_{Link}$ (Ni, Nj).

$$C_{Route}(N7,N6,N5,N1) = C_L,(N7,N6) + C_{Link}(N6,N5) + C_{Link}(N5,N1) \quad \text{[Formula 5]}$$

$$C_{Route}(N7,N4,N3,N2,N1) = C_{Link}(N7,N4) + C_{Link}(N4,N3) + C_{Link}(N3,N2) + C_{Link}(N2,N1) \quad \text{[Formula 6]}$$

Next, an algorithm used for calculating the arrival rate i of unicast frames in embodiment 1 is explained. In the algorithm for calculating the arrival rate in embodiment 1, the arrival rate i of unicast frames in each link is calculated (estimated) according to only the reception rate of Hello frames, that is, according to only the reception rate in one direction in the link.

Here, in embodiment 1, a unicast frame refers to a data frame and an ACK (ACKnowledgement) frame, and the arrival rate i of unicast frames is the probability at which a data frame arrives at a forwarding-destination adjacent node apparatus 1 and an ACK frame from the forwarding-destination adjacent node apparatus 1 arrives at the forwarding-source node apparatus 1.

That is, the arrival rate i of unicast frames is obtained by multiplying the reception rate in the outward route in the link (the reception rate of data frames) by the reception rate in the inward route in the link (the reception rate of ACK frames).

Assuming that the reception rate of 1-bit data in one direction and the reception rate of Hello frames of frame-length $L_H$ bits are expressed as in Formula 7 and Formula 8, respectively, Formula 9 below is established.

$$\begin{pmatrix} \text{RECEPTION RATE OF 1-BIT DATA} \\ \text{IN ONE DIRECTION} \end{pmatrix} = P_{Link}^{PAR(1)} \quad \text{[Formula 7]}$$

$$\begin{pmatrix} \text{RECEPTION RATE OF HELLO FRAMES} \\ \text{OF FRAME-LENGTH } L_H \text{ BITS} \end{pmatrix} = P_{Link}^{PAR\_H} \quad \text{[Formula 8]}$$

$$P_{Link}^{PAR\_H} = \left(P_{Link}^{PAR(1)}\right)^{L_H} \quad \text{[Formula 9]}$$

Therefore, the reception rate of 1-bit data in one direction may be calculated using Formula 10 and according to the reception rate of Hello frames of frame-length $L_H$ bits. That is, the reception rate of 1-bit data in one direction may be calculated by raising the reception rate of a Hello frame of frame-length $L_H$ bits to the {Reciprocal of the frame length $L_H(1/L_H)$} th power.

$$P_{Link}^{PAR(1)} = \left(P_{Link}^{Par\_H}\right)^{1/L_H} \quad \text{[Formula 10]}$$

Meanwhile, the reception rate of data frames of frame-length $L_D$ bits and the reception rate of ACK frames of frame-length $L_A$ bits may be calculated according to Formula 11 and Formula 12, respectively, using the reception rate of 1-bit data in one direction.

$$\begin{pmatrix} \text{RECEPTION RATE OF DATA FRAMES} \\ \text{OF FRAME-LENGTH } L_D \text{ BITS} \end{pmatrix} = \left(P_{Link}^{PAR(1)}\right)^{L_D} \quad \text{[Formula 11]}$$

$$\begin{pmatrix} \text{RECEPTION RATE OF ACK FRAMES} \\ \text{OF FRAME-LENGTH } L_A \text{ BITS} \end{pmatrix} = \left(P_{Link}^{PAR(1)}\right)^{L_A} \quad \text{[Formula 12]}$$

As described above, the arrival rate i of unicast frames is obtained by multiplying the reception rate in the outward route in the link (the reception rate of data frames) by the reception rate in the inward route in the link (the reception rate of ACK frames). Therefore, the arrival rate i of unicast frames may be expressed as in Formula 13 below according to Formula 10 through Formula 12. That is, the arrival rate i of unicast frames may be calculated according to the reception rate of Hello frames and the frame lengths for the respective frame types.

$$\begin{pmatrix} \text{ARRIVAL RATE } i \\ \text{OF UNICAST FRAMES} \end{pmatrix} = \left(P_{Link}^{PAR(1)}\right)^{(L_D+L_A)/L_H} \quad \text{[Formula 13]}$$

Here, FIG. 2 is an example in which the arrival rate i with respect to the reception rate of Hello frames, the value $i_S$ after the discretization of the arrival rate i, and the usage rate UR(i) of the link with respect to the reception rate of Hello frames are respectively expressed in a graph. The example illustrated in FIG. 2 is an example with thresholds Sk that minimize the estimated metric $M_E$ defined in Formula 1 assuming the thresholds Sk (k=1, 2, 3, 4), that is, assuming the number of thresholds to be 4. To set the threshold Sk so as to minimize estimated metric $M_E$ defined in Formula 1 is to set the threshold Sk of the arrival rate i so as to divide the range of the reception rates of Hello frames with a high usage rate UR(i) into more segments. That is, this is to set intervals between thresholds Sk narrower in the range of the arrival rates i with a high usage rate UR(i).

Figure 3:
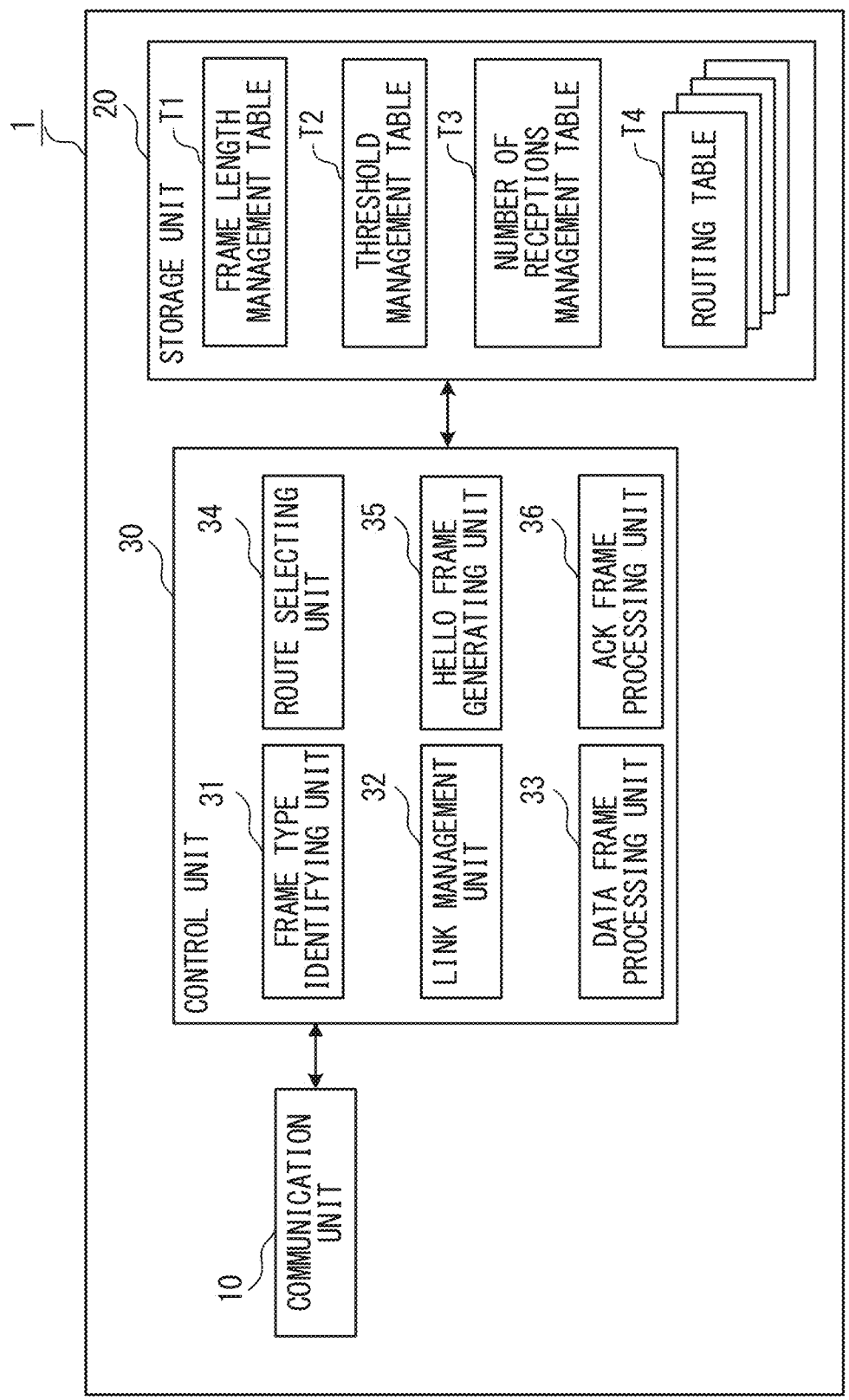
FIG. 3 is a block diagram illustrating a configuration example of a node apparatus which constitutes a network in embodiment 1.

Next, referring to FIG. 3, the node apparatus 1 in the present embodiment 1 is explained. FIG. 3 is a functional block diagram illustrating a configuration example of the node apparatus 1 constituting the network 100 in the present embodiment 1.

As illustrated in FIG. 3, the node apparatus 1 is equipped with a communication unit 10, a storage unit 20, and a control unit 30.

The communication unit 10 is equipped with a communication module or the like, for example, and performs communication with other node apparatuses 1. For example, the communication unit 10 transmits and receives a frame such as a Hello frame. In addition, upon receiving a frame, the communication unit 10 outputs the received frame to a frame type identifying unit 31 (described in detail later).

The storage unit 20 is equipped with a RAM (Random Access Memory), a ROM (Read Only Memory), a flash memory, and so on, for example. The storage unit 20 functions as a work area for an MPU (Micro-Processing Unit) provided in the control unit 30, a program area to store various programs such as an operation program for controlling the entirety of the node apparatus 1, and a data area to store various data such as a frame length management table T1, a threshold management table T2, a number of receptions management table T3, and a routing table T4 described in detail later. In addition, the data area also stores the local node ID and so on.

Figure 4:
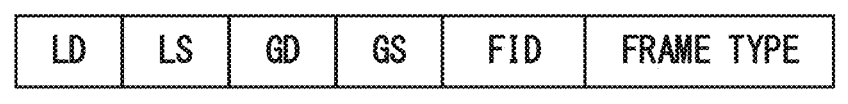

Here, referring to FIG. 4 and FIG. 5, the header of the data frame generated by a data frame processing unit 33 (described in detail later) is explained. FIG. 4 illustrates a format example for a header of a data frame in the present embodiment 1. FIG. 5 gives a description of each field in the format example illustrated in FIG. 4.

The header of a data frame in the present embodiment 1 includes LD (Local Destination), LS (Local Source), GD (Global Destination), GS (Global Source), FID (Frame IDentification), and a frame type, as illustrated in FIG. 4.

The LS is the node apparatus 1 which is the forwarding source, and referring to FIG. 1, for example, the LS of a data frame transmitted by the node apparatus N7 to the node apparatus N6 is the node apparatus N7. The LD is an adjacent node apparatus 1 to be the forwarding destination, and a route selecting unit 34 (described in detail later) of the node apparatus 1 which is the LS refers to a routing table T4 and selects the LD. For example, referring to FIG. 1, the LD of a data frame transmitted by the node apparatus N7 to the node apparatus N6 is the node apparatus N6.

The GS is the node apparatus 1 which is the issuing source of a data frame, and the GD is the node apparatus 1 to be the final destination of a data frame. For example, referring to FIG. 1, when a data frame issued by the node apparatus N7 is relayed by the node apparatus N6 and the node apparatus N5 in this order and transmitted finally to the node apparatus N1, the GD of the data frame is the node apparatus N1, and the GS is the node apparatus N7.

The FID is the frame ID in the node apparatus 1 which is the issuing source of the data frame, that is, a running number that indicates the number of generations of data frames in the node apparatus 1 which is the issuing source.

The frame type is information that indicates the type of the frame, and in a data frame, information that indicates that the type of the frame is the data frame is stored in the "frame type" field. In the present embodiment 1, there are three frame types, namely a data frame, an ACK frame, and a Hello frame.

A data frame is a frame which includes, as the payload, information that the issuing-source node apparatus 1 (GS) is going to deliver to the node apparatus 1 (GD) to be the final destination.

An ACK frame is a frame transmitted from the node apparatus 1 (LD) of the receiving side that received a data frame to report to the node apparatus 1 (LS) of the transmitting side that "the data frame has been received", that is, an acknowledgement response.

A Hello frame is generated by a Hello frame generating unit 35 (described in detail later), and is a frame for reporting the existence of the local node apparatus 1 to other node apparatuses 1 and which includes information that is required for route generation, as described above.

Next, referring to FIG. 6 and FIG. 7, the header of a Hello frame generated by the Hello frame generating unit 35 is explained. FIG. 6 illustrates a format example for the header of a Hello frame in the present embodiment 1. FIG. 7 gives a description of each field in the format example illustrated in FIG. 6.

The header of a Hello frame in the present embodiment 1 includes the transmission-source ID, the FID, the frame type, and pairs comprising the GD and the route cost $C_{Route}$, as illustrated in FIG. 6.

The transmission-source ID is the node ID of the node apparatus 1 that is the transmission source of the Hello frame, and it is, for example, the address of the transmission-source node apparatus 1.

The FID is the frame ID in the node apparatus 1 that is the transmission source of the Hello frame, that is, a running number which indicates the number of generations of the Hello frame (that is, the number of transmissions) in the transmission-source node apparatus 1.

The frame type is information that indicates the type of the frame, and in a Hello frame, information that indicates that the type of the frame is a Hello frame is stored in the "frame type" field.

The pairs comprising the GD and the route cost $C_{Route}$ are pairs comprising the node ID of a final destination (GD) that may be reached from the node apparatus 1 that is the transmission source of the Hello frame and the minimum route cost $C_{Route}$ among the routes from this GD to the transmission-source node apparatus 1.

Next, referring to FIG. 8 through FIG. 11, the frame length management table T1, the threshold management table T2, the number of receptions management table T3, and the routing table T4 stored in the data area of the storage unit 20 are respectively explained.

FIG. 8 illustrates the frame length management table T1 in the present embodiment 1. For example, the frame length management table T1 is a table which is referred to when a link management unit 32 (described in detail later) calculates the arrival rate, and is a table in which the "frame type" and the "frame length" are associated, as illustrated in FIG. 8.

Figure 9:
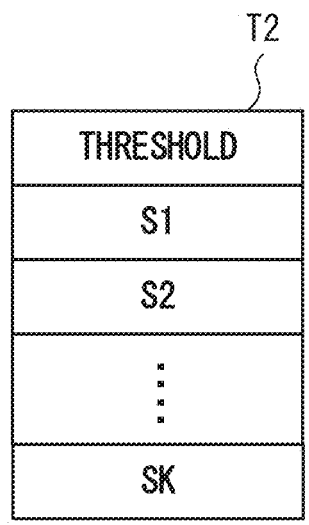
FIG. 9 illustrates an example of a threshold management table in embodiment 1.

FIG. 9 illustrates an example of the threshold management table T2 in the present embodiment 1. The threshold management table T2 is a table which is referred to when the link management unit 32 calculates the link cost $C_{Link}$, and is a table in which the values of the respective thresholds Sk are managed, as illustrated in FIG. 9. These thresholds Sk are thresholds calculated in advance using the method described above.

FIG. 10 illustrates an example of the number of receptions management table T3 in the present embodiment 1, and is an example of the number of receptions management table T3 of the node apparatus N7. The number of receptions management table T3 in the present embodiment 1 is a table managed by the link management unit 32, and is a table in which "node ID of the adjacent node apparatus 1" and the "number of receptions" are associated, as illustrated in FIG. 10.

The number of receptions is the number of receptions of Hello frames transmitted from the corresponding adjacent node apparatus 1, and it is incremented by the link management unit 32 each time a Hello frame is received from the corresponding adjacent node apparatus 1.

FIG. 11 illustrates an example of a routing table T4 in the present embodiment 1, and is an example of the routing table T4 of the node apparatus N7. The routing table T4 in the present embodiment 1 is managed by the link management unit 32, and is a table in which information (the route cost of each route) required for selecting the adjacent node apparatus 1 to be the forwarding destination of a data frame is managed for each GD. For example, the routing table T4 in the present embodiment 1 is a table in which the "node ID of the GD", "node ID of the adjacent node apparatus 1", "link cost $C_{Link}$" and "route cost $C_{Route}$" are associated, as illustrated in FIG. 11.

The node ID of the adjacent node apparatus 1 is the node ID of the adjacent node apparatus 1 to be a forward destination candidate when transmitting a data frame to the corresponding GD.

The link cost $C_{Link}$ is the link cost $C_{Link}$ of the link with the corresponding adjacent node apparatus 1. The route cost $C_{Route}$ is an integrated value of the link costs $C_{Link}$ of the respective links on the route from the GD to the local node apparatus 1, and an integrated value of the route cost $C_{Route}$ included in the Hello frame from the corresponding adjacent node apparatus 1 and the link cost $C_{Link}$ of the link with the corresponding adjacent node apparatus 1 is stored by the link management unit 32.

Returning to FIG. 3, the control unit 30 is equipped with an MPU or the like, for example, and executes an operation program stored in the program area of the storage unit 20, to realize functions as the frame type identifying unit 31, the link management unit 32, the data frame processing unit 33, the route selecting unit 34, the Hello frame generating unit 35, and an ACK frame processing unit 36, as illustrated in FIG. 3. In addition, the control unit 30 executes an operation program to execute processes such as a control process for controlling the entirety of the node apparatus 1, a frame reception process and a Hello frame generation process described later, and the like.

The frame type identifying unit 31 identifies the type of a frame received at the communication unit 10. Specifically, upon receiving a frame, the communication unit 10 outputs the received frame to the frame type identifying unit 31. Then, the frame type identifying unit 31 analyzes the header of the input frame, and identifies the type of the frame according to the frame type. Then, when the identified type of the frame is a Hello frame, the frame type identifying unit 31 outputs the received frame to the link management unit 32, when the identified type of the frame is a data frame, outputs the frame to the data frame processing unit 33, and when the identified type of the frame is an ACK frame, outputs the received frame to the ACK frame processing unit 36, respectively.

The link management unit 32 performs route management by managing the number of receptions management table T3 and the routing table T4. More specifically, when the received frame is a Hello frame the link management unit 32 analyzes the received Hello frame, and updates the number of receptions management table T3 and the routing table T4 according to the analysis result.

For example, the link management unit 32 identifies the adjacent node apparatus 1 which is the transmission source of the Hello frame, according to the transmission-source ID of the received Hello frame. Then, the link management unit 32 refers to the number of receptions management table T3, and increments the number of receptions corresponding to the identified adjacent node apparatus 1. At this time, when the node ID that matches the transmission-source ID of the received Hello frame does not exist in the number of receptions management table T3, the link management unit 32 adds an entry, associates the transmission-source ID and the number of receptions "1", and stores them.

In addition, for example, the link management unit 32 identifies the number of transmissions of the Hello frame in the transmission-source node apparatus 1, according to the FID of the received Hello frame. Then, the link management unit 32 calculates the reception rate of Hello frames according to the incremented number of receptions and the identified number of transmissions, and also refers to the frame length management table T1 to obtain the frame lengths ($L_D$, $L_A$, $L_H$) of the respective frame types.

Then, the link management unit 32 calculates the arrival rate i of unicast frames in the link with the node apparatus 1 which is the transmission-source of the received Hello frame, using Formula 13 mentioned above and according to the calculated reception rate of Hello frames and the frame lengths of the respective frame types.

The link management unit 32 then refers to the threshold management table T2 to obtain the thresholds Sk, and discretizes the calculated arrival rate i according to the obtained thresholds Sk. More specifically, the link management unit 32 discretizes the calculated arrival rate i according to Formula 2, for example. Then, the link management unit 32 calculates the reciprocal of the value $i_S$ after the discretization of the calculated arrival rate i as the link cost $C_{Link}$, and updates the link cost $C_{Link}$ corresponding to the identified adjacent node apparatus 1 in the routing table T4, with the calculated link cost $C_{Link}$.

At this time, when an entry for the identified adjacent node apparatus 1 does not exist in the routing table T4, or when an entry for the identified adjacent node apparatus 1 does not exist in a part of the GDs associated with the route costs $C_{Route}$ included in the Hello frame, the link management unit 32 adds an entry and stores the calculated link cost $C_{Link}$ in the corresponding field.

Further, the link management unit 32 updates the route cost $C_{Route}$ corresponding to the identified adjacent node apparatus 1 (transmission source) of the corresponding GD in the routing table T4, with an integrated value of the route cost $C_{Route}$ associated with the GD included in the received Hello frame and the calculated link cost $C_{Link}$.

The data frame processing unit 33 performs processing of a received data frame. More specifically, first, when a data frame is input from the frame type identifying unit 31, the data frame processing unit 33 analyzes the header of the input data frame to judge whether or not the LD matches the local node ID. Then, when the LD does not match the local node ID, the data frame processing unit 33 discards the received data frame.

On the other hand, when the LD matches the local node ID, the data frame processing unit 33 instructs the ACK frame processing unit 36 to generate an ACK frame, and also judges whether or not the GD matches the local node ID. That is, the data frame processing unit 33 judges whether or not the final destination of the received data frame is the local node apparatus 1.

When the final destination of the received data frame is the local node apparatus 1, the data frame processing unit 33 outputs the received data frame to an upper layer. The upper layer performs processing of the received data frame in response to the input of the data frame.

On the other hand, when the final destination of the received data is another node apparatus 1, the data frame processing unit 33 instructs the route selecting unit 34 to select the LD, in order to forward the received data frame.

In addition, when the LD selected by the route selecting unit 34 is reported, the data frame processing unit 33 performs a transmission process for the data frame. More specifically, when the LD selected by the route selecting unit 34 is reported, the data frame processing unit 33 sets the local node ID in the LS of the header, and also sets the LD selected by the route selecting unit 34 in the LD of the header. Then, the data frame processing unit 33 forwards the data frame to the adjacent node apparatus 1 which is the set LD, via the communication unit 10.

Further, the data frame processing unit 33 generates a data frame in response to a request from the upper layer, and transmits the generated data frame to the adjacent node apparatus 1 via the communication unit 10. At this time, the transmission-destination adjacent node apparatus 1 is selected by the route selecting unit 34 according to the GD.

The route selecting unit 34 refers to the routing table T4 when it is necessary to forward a received data frame (or, a generated data frame) to another node apparatus 1, and selects the adjacent node apparatus 1 to be the forwarding destination of the data frame, that is, the LD. Then, the route selecting unit 34 reports the selected LD to the data frame processing unit 33.

More specifically, when an instruction is given from the data frame processing unit 33 for selecting the LD, the route selecting unit 34 identifies the routing table T4 corresponding to the GD of the data frame which is the forwarding object. Then, the route selecting unit 34 selects the transmission-destination adjacent node apparatus 1, that is, the LD, so that the route cost $C_{Route}$ to the GD is minimized, according to the route cost $C_{Route}$ in the identified routing table T4.

At a prescribed timing (for example, regularly), the Hello frame generating unit 35 generates a Hello frame such as illustrated in FIG. 6, and transmits the generated Hello frame to the adjacent node apparatus 1, via the communication unit 10. At this time, the Hello frame generating unit 35 refers to the routing table T4 and for each of the registered GDs in the routing table T4, identifies the minimum route cost $C_{Route}$ among the route costs $C_{Route}$ of the adjacent node apparatuses 1 corresponding to the GD. Then, the Hello frame generating unit 35 associates the identified route cost $C_{Route}$ with the node ID of the corresponding GD and stores them respectively in the Hello frame.

The ACK frame processing unit 36 generates an ACK frame in response to an instruction from the data frame processing unit 33 for generating an ACK frame, and transmits the generated ACK frame to the node apparatus 1 (LS) that is the transmission source of the received data frame, via the communication unit 10.

Figure 12:
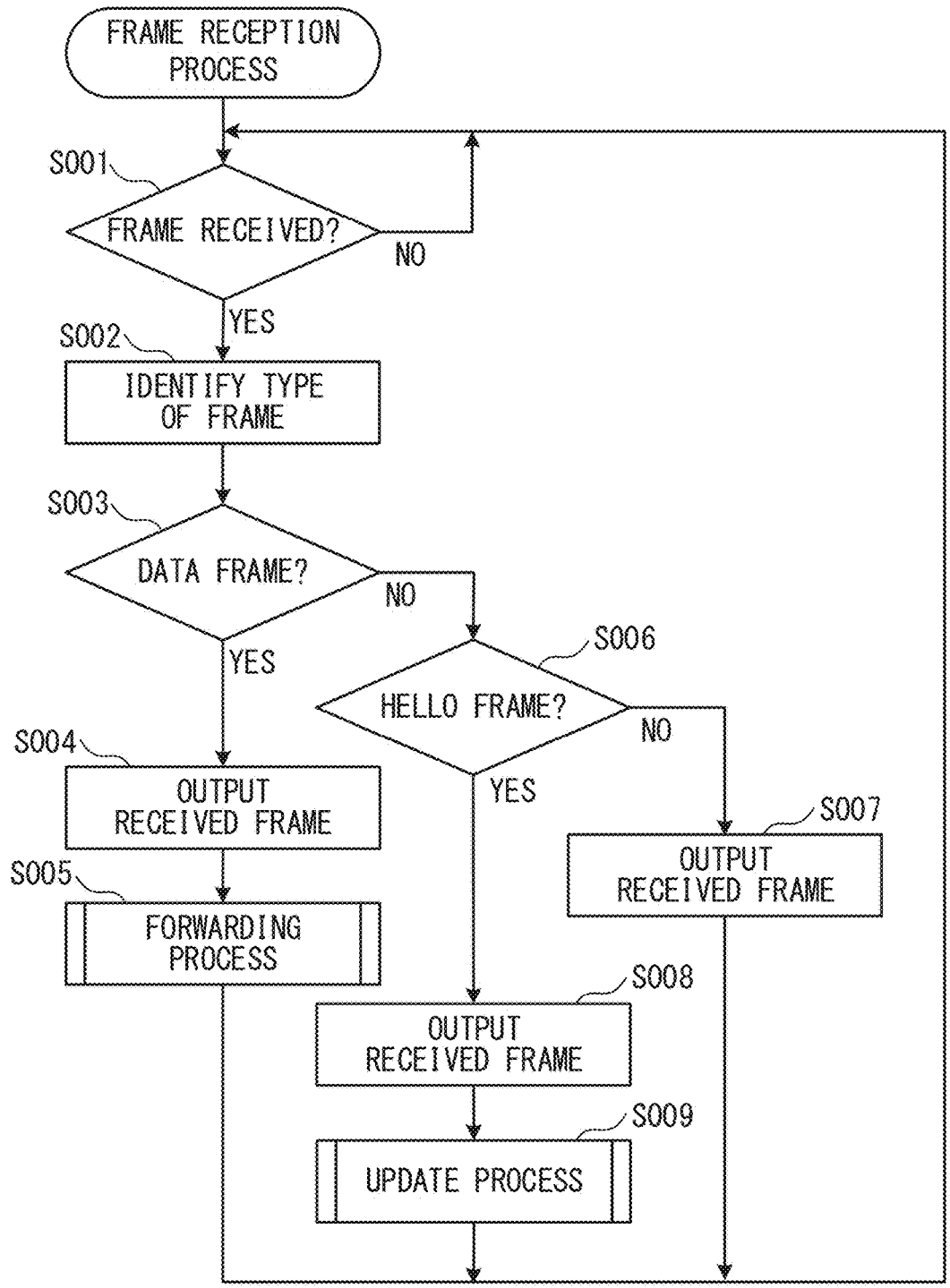
FIG. 12 is an example of a flowchart for explaining the flow in a frame reception process in embodiment 1.

Next, referring to FIG. 12, the flow of a frame reception process in the present embodiment 1 is explained. FIG. 12 is an example of a flowchart for explaining the flow of the frame reception process in the present embodiment 1. The frame reception process starts with reception of a frame as a trigger.

The frame type identifying unit 31 judges whether or not a frame has been received (step S001). When the frame type identifying unit 31 judges that no frame has been received (step S001: NO), the process in step S001 is repeated to wait for reception of a frame.

On the other hand, when judging that a frame has been received (step S001: YES), the frame type identifying unit 31 analyzes the header of the received frame, identifies the type of the frame according to the frame type (step S002), and judges whether or not the identified type is a data frame (step S003).

When judging that the frame is a data frame (step S003: YES), the frame type identifying unit 31 outputs the received frame to the data frame processing unit 33 (step S004). Then, the data frame processing unit 33 performs a forwarding process for the received data frame in cooperation with the route selecting unit 34 and so on (step S005). Then, the process returns to the process in S001, and the process described above is repeated.

On the other hand, when judging that the frame is not a data frame (step S003: NO), the frame type identifying unit 31 further judges whether the identified type is a Hello frame (step S006).

When judging that the frame is an ACK frame (step S006: NO), the frame type identifying unit 31 outputs the received ACK frame to the ACK frame processing unit 36 (step S007). Then, the process returns to the process in step S001, and the process described above is repeated.

On the other hand, when judging that the frame is a Hello frame (step S006: YES), the frame type identifying unit 31 outputs the received frame to the link management unit 32 (step S008). Then. the link management unit 32 performs an update process for the number of receptions management table T3 and the routing table T4 (step S009). Then, the process returns to the process in step S001, and the process described above is repeated.

Figure 13:
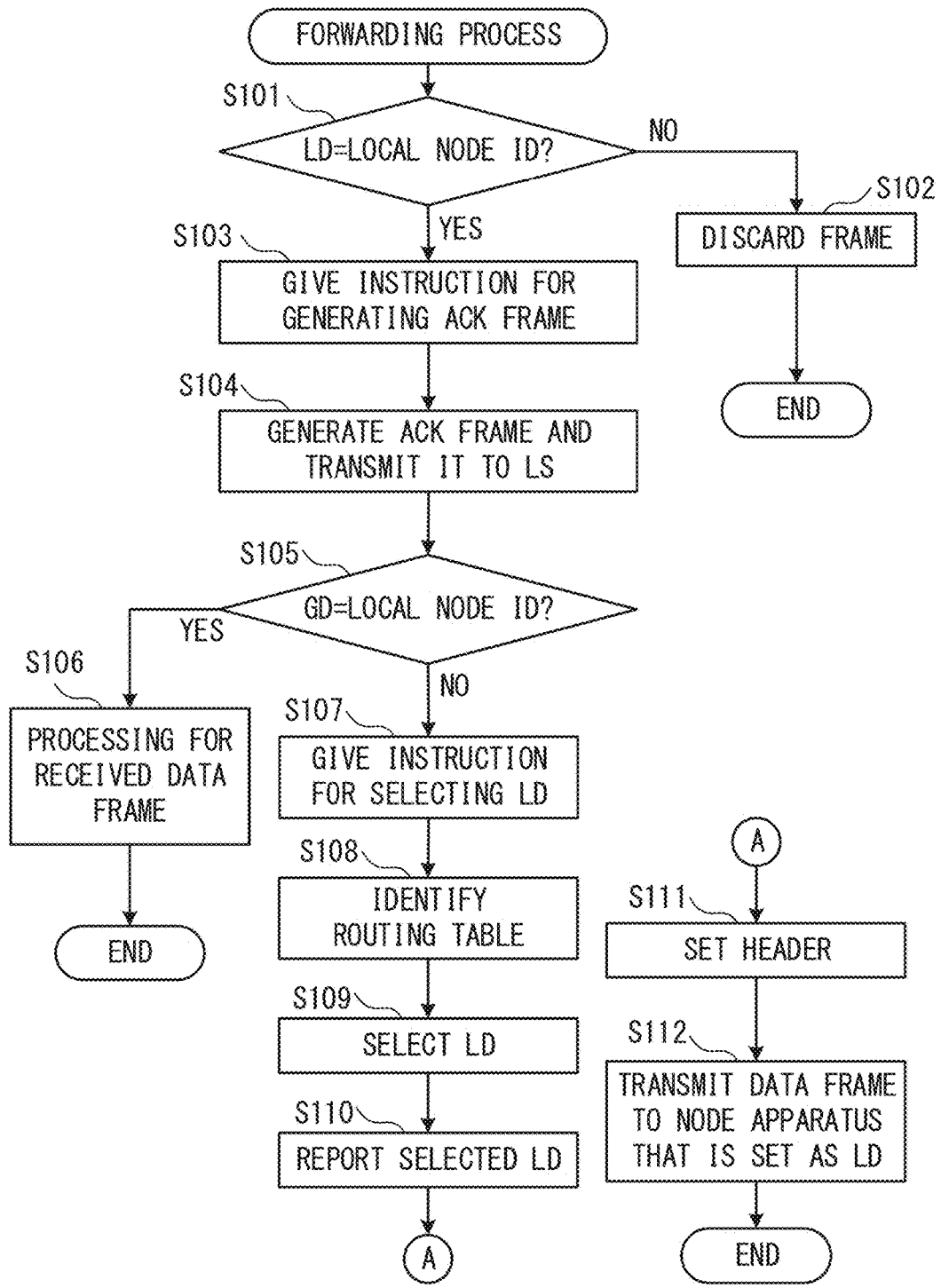
FIG. 13 is an example of a flowchart for explaining the flow in a forwarding process in embodiment 1.

Next, referring to FIG. 13, the flow of a forwarding process in the present embodiment 1 is explained. FIG. 13 is an example of a flowchart for explaining the forwarding process in the present embodiment 1. The forwarding process is a process corresponding to the process in step S005 in the frame reception process described above.

The data frame processing unit 33 analyzes the header of the received data frame and judges whether or not the LD matches the local node ID (step S101).

When judging that the LD does not match the local node ID (step S101: NO), the data frame processing unit 33 discards the received data frame (step S102). Then, this process is terminated.

On the other hand, when judging that the LD matches the local node ID (step S101: YES), the data frame processing unit 33 instructs the ACK frame processing unit 36 to generate an ACK frame (step S103). Then, the ACK frame processing unit 36 generates an ACK frame, and transmits the generated ACK frame to the transmission-source node apparatus 1 (LS), via the communication unit 10 (step S104).

Then, the data frame processing unit 33 judges whether or not the GD matches the local node ID (step S105). That is, the data frame processing unit 33 judges whether or not the final destination of the received data frame is the local node apparatus 1.

When judging that the GD matches the local node ID (step S105: YES), the data frame processing unit 33 outputs the received data frame to the upper layer, and the upper layer performs processing of the received data frame in response to the input of the data frame (step S106). Then, this process is terminated.

On the other hand, when judging that the GD does not match the local node ID (step S105: NO), the data frame processing unit 33 instructs the route selecting unit 34 to select the LD (step S107).

On receiving the instruction for selecting the LD, the route selecting unit 34 identifies the routing table T4 corresponding to the GD of the forwarding-object data frame (step S108), and selects the LD so as to minimize the route cost $C_{Route}$ of the route for the GD (step S109). Then, the route selecting unit 34 reports the selected LD to the data frame processing unit 33 (step S110).

On receiving the report of the selected LD, the data frame processing unit 33 performs setting of the header (step S111), and forwards the data frame to the adjacent node apparatus 1 that is the LD selected by the route selecting unit 34, via the communication unit 10 (step S112). Then, this process is terminated.

Figure 14:
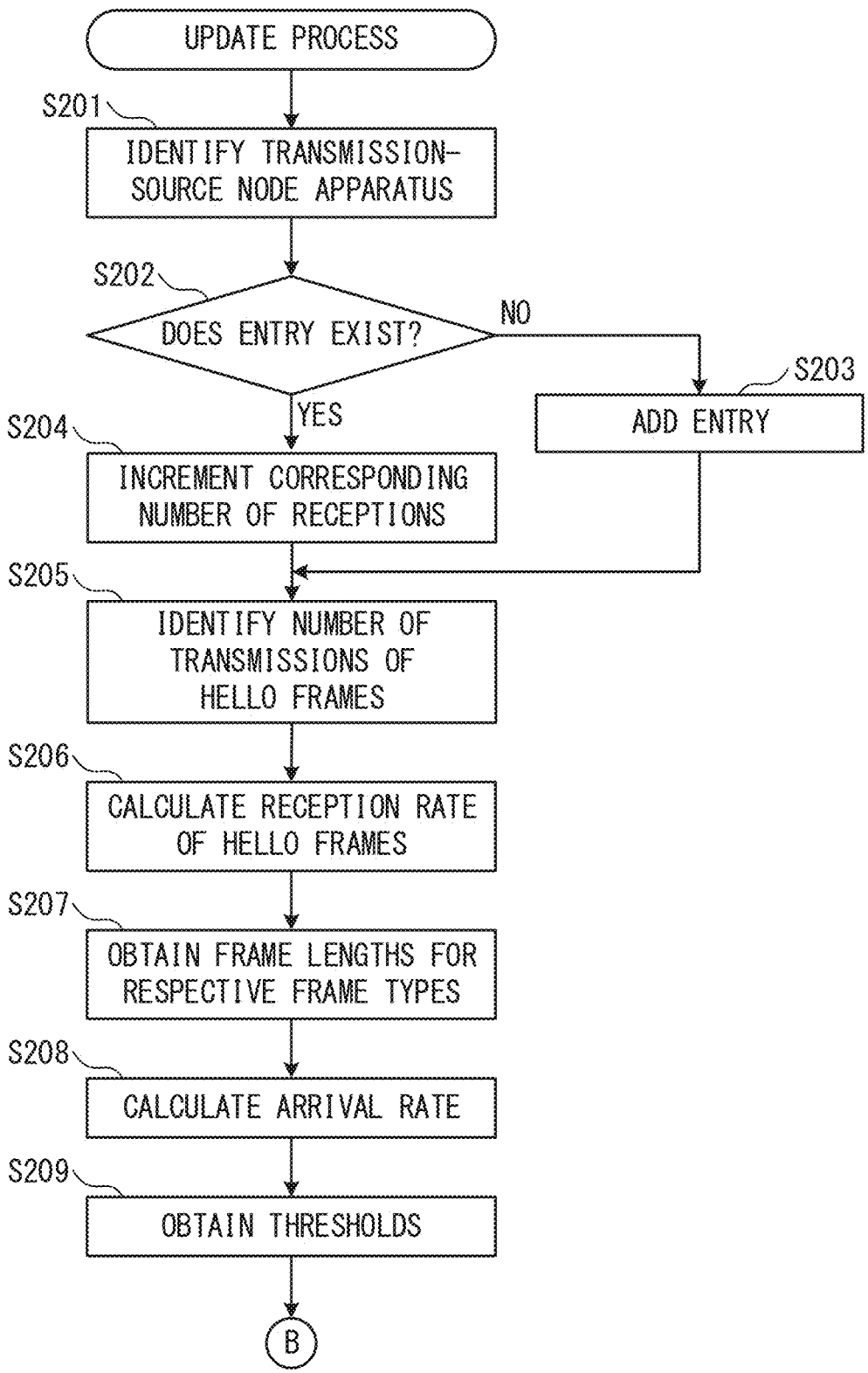
FIG. 14 is a portion of an example of a flowchart for explaining the flow in an update process in embodiment 1.
Figure 15:
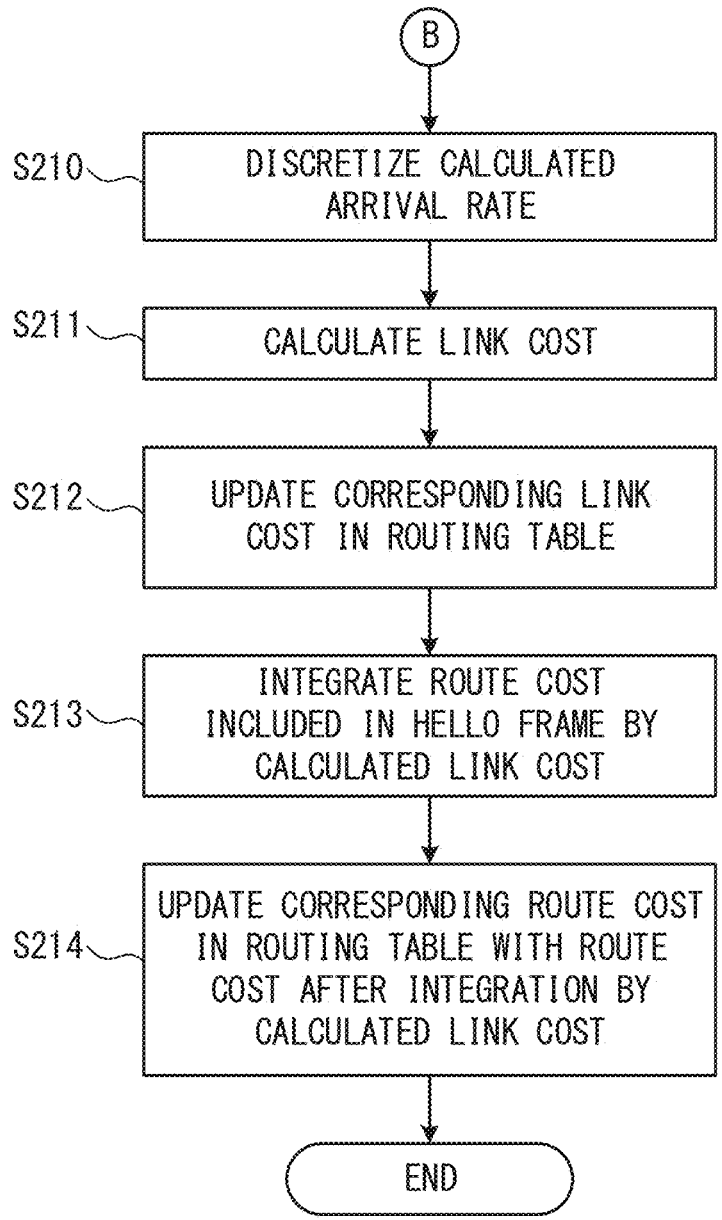
FIG. 15 is another portion of an example of a flowchart for explaining the flow in a frame reception process in embodiment 1.

Next, referring to FIG. 14 and FIG. 15, the flow of an update process in the present embodiment 1 is explained. FIG. 14 and FIG. 15 are a portion and another portion of an example of a flowchart for explaining the flow of the update process in the present embodiment 1, respectively. The update process is a process corresponding to the process in step S009 in the frame reception process described above.

The link management unit 32 analyzes a received frame to identify the adjacent node apparatus 1 that is the transmission source of a Hello frame according to the transmission-source ID (step S201), and judges whether or not an entry for the identified adjacent node apparatus 1 exists in the number of receptions management table T3 (step S202).

When judging that an entry for the identified adjacent node apparatus 1 does not exist (step S202: NO), the link management unit 32 adds an entry, associates the transmission-source ID and the number of receptions "1", and stores them in the number of receptions management table T3 (step S203). Then, the process proceeds to the process in step S205 described later.

On the other hand, when judging that an entry for the identified adjacent node apparatus 1 exists (step S202: YES), the link management unit 32 increments the number of receptions corresponding to the identified adjacent node apparatus 1 (step S204).

Then, the link management unit 32 identifies the number of transmissions of Hello frames in the transmission-source node apparatus 1 based on the FID of the received Hello frame (step S205). The link management unit 32 then calculates the reception rate of Hello frames according to the incremented number of receptions and the identified number of transmissions (step S206), and also refers to the frame length management table T1 to obtain the frame lengths ($L_D$, $L_A$, $L_H$) for the respective frame types (step S207).

Then, the link management unit 32 calculates the arrival rate i of unicast frames in the link with the node apparatus 1 that is the transmission source of the received Hello frame, according to the calculated reception rate of Hello frames and the obtained frame lengths for the respective frame types and using Formula 13 mentioned above (step S208).

The link management unit 32 then refers to the threshold management table T2 to obtain the thresholds Sk (step S209), and discretizes the calculated arrival rate i according to the obtained thresholds Sk (step S210).

Then, the link management unit 32 calculates the reciprocal of the value $i_S$ after the discretization as the link cost $C_{Link}$ (step S211), and updates the link cost $C_{Link}$ corresponding to the identified adjacent node apparatus 1 in the routing table T4 (step S212). At this time, when no entry for the identified adjacent node apparatus 1 exists in the routing table T4, or when no entry for the identified adjacent node apparatus 1 exists in a part of the GDs associated with the route cost $C_{Route}$ included in the Hello frame, the link management unit 32 adds an entry, and stores the calculated link cost $C_{Link}$ in the corresponding field.

The link management unit 32 then integrates the respective route costs $C_{Route}$ included in the received Hello frame by the calculated link cost $C_{Link}$, to calculate the route cost $C_{Route}$ to the local node apparatus 1 (step S213).

Then, the link management unit 32 updates the corresponding route costs $C_{Route}$ in the routing table T4 with the route costs $C_{Route}$ after the integration of the respective calculated route costs $C_{Route}$ included in the received Hello frame by the calculated link cost $C_{Link}$ (step S214). Then, this process is terminated.

Figure 16:
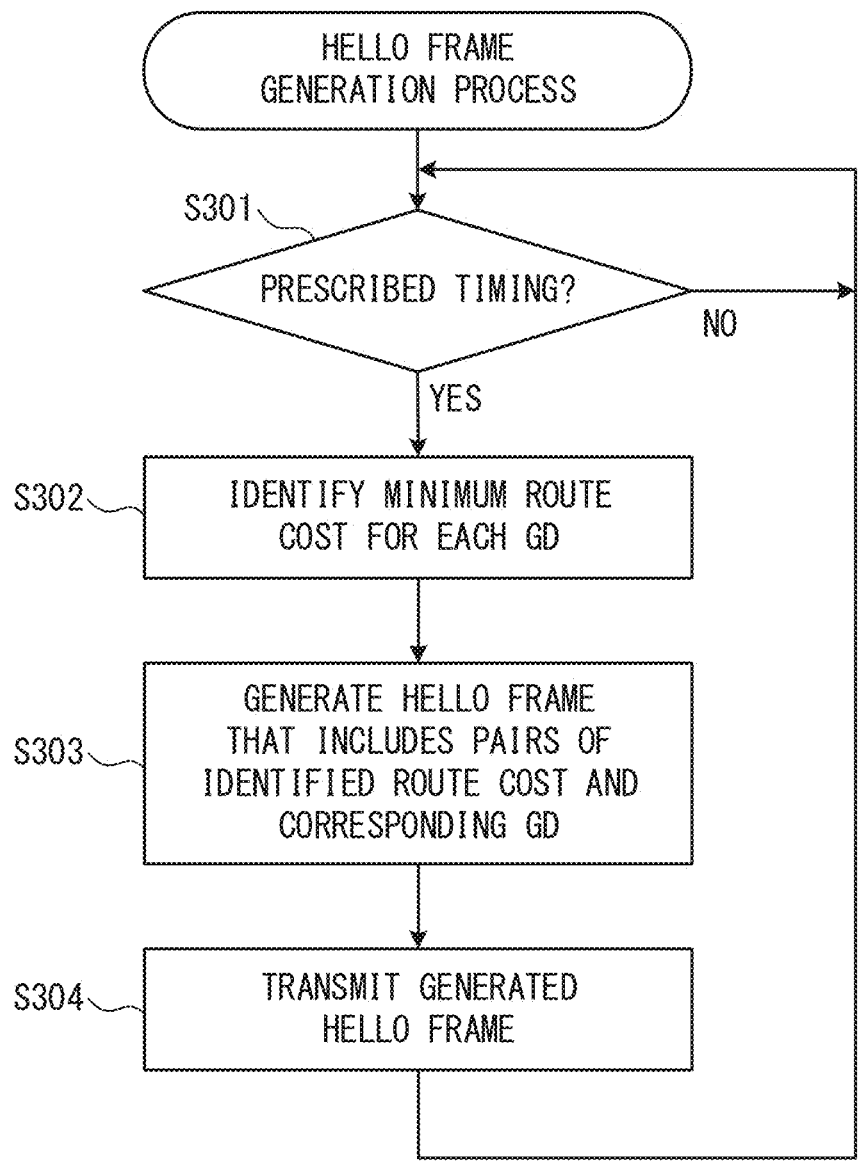
FIG. 16 is an example of a flowchart for explaining the flow in a Hello frame generation process in embodiment 1.

Next, referring to FIG. 16, the flow of a Hello frame generation process in the present embodiment 1 is explained. FIG. 16 is an example of a flowchart for explaining the Hello frame generation process in the present embodiment 1. The Hello frame generation process starts with the arrival of a prescribed timing as a trigger.

The Hello frame generating unit 35 judges whether or not the prescribed timing has arrived (step S301). When the Hello frame generating unit 35 judges that the prescribed timing has not arrived yet (step S301: NO), the process in step S301 is repeated to wait for the arrival of the prescribed timing.

On the other hand, when judging that the prescribed timing has arrived (step S301: YES), the Hello frame generating unit 35 refers to the routing table T4 to identify, for each registered GD in the routing table T4, the minimum route cost $C_{Route}$ among the route costs $C_{Route}$ of the adjacent node apparatuses 1 corresponding to the GD (step S302). Then, the Hello frame generating unit 35 generates a Hello frame that includes pairs comprising the node ID of the GD and the identified route cost $C_{Route}$ (step S303).

The Hello frame generating unit 35 then transmits the generated Hello frame to the adjacent node apparatus 1, via the communication unit 10 (step S304). Then, the process returns to the process in step S301, and the process described above is repeated.

According to embodiment 1 described above, the node apparatus 1 calculates the arrival rate i in the links with adjacent node apparatuses 1, and discretizes the arrival rate i according to thresholds Sk that are set so that the intervals between the thresholds Sk in the range in which a large number of the arrival rates i in the links whose frequency of use FU(i) is high exist becomes narrower. Then, the node apparatus 1 calculates the link cost $C_{Link}$ according to the value $i_S$ after the discretization, and obtains, from each adjacent node apparatus 1, the route cost $C_{Route}$ for each route to each GD that may be reached from the adjacent node apparatus 1. The node apparatus 1 then integrates the obtained route costs $C_{Route}$ by the calculated link cost $C_{Link}$, to calculate the route cost $C_{Route}$ from the local node apparatus 1 to each of the GDs that may be reached via the adjacent node apparatus 1. Then, when transmitting a data frame, the node apparatus 1 selects the adjacent node apparatus 1 to be the transmission destination of the data frame, according to the route cost $C_{Route}$ of the route from the local node apparatus 1 to the GD of the transmission-object data frame.

By so doing, it becomes possible to make the error between the arrival rate i in links whose frequency of use FU(i) is high and the value $i_S$ after discretization smaller while suppressing the occurrence of loop routes, and accordingly, it becomes possible to select a more suitable route.

In addition, according to embodiment 1 described above, the node apparatus 1 calculates the reception rate of Hello frames, and calculates the link cost $C_{Link}$ according to the calculated reception rate of Hello frames. By so doing, it becomes possible to regularly calculate the link cost $C_{Link}$, because Hello frames are transmitted regularly. Therefore, it becomes possible to maintain an appropriate route.

Furthermore, according to embodiment 1 described above, the node apparatus 1 selects the adjacent node apparatus 1 to be the transmission destination of the data frame, so as to minimize the route cost $C_{Route}$ of the route from the local node apparatus 1 to the GD of the transmission-object data frame. By so doing, it becomes possible to select a more appropriate route.

In addition, according to embodiment 1 described above, the node apparatus 1 calculates the reception rate according to the number of receptions of frames of a specific frame type and the number of transmissions for which frames of a specific frame type were transmitted to the local node apparatus 1, included in a received frame of the specific frame type. Accordingly, it becomes possible to calculate the link cost $C_{Link}$ using a simple method without increasing the network load.

Embodiment 2 is explained below.

In the present embodiment 2, a case in which the node apparatus 1 updates the thresholds Sk managed in the threshold management table T2 is explained.

FIG. 17 is a functional block diagram illustrating a configuration example of the node apparatus 1 in the present embodiment 2. The basic configuration of the node apparatus 1 in the present embodiment 2 is the same as that in the case of embodiment 1. However, there is a difference compared with the case of embodiment 1 in that a frequency of use management table T5 is stored in the data area of the storage unit 20, as illustrated in FIG. 17. In addition, the configuration of the threshold management table T2 is different from that in the case of embodiment 1. Also, functions served by the link management unit 32, the data frame processing unit 33 and the Hello frame generating unit 35 are slightly different from those in the case of embodiment 1.

Figure 18:
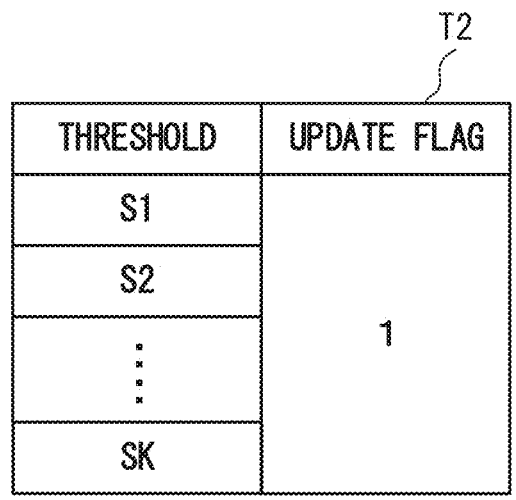
FIG. 18 illustrates an example of a threshold management table in embodiment 2.
Figure 19:
FIG. 19 illustrates an example of a frequency of use management table in embodiment 2.

Here, referring to FIG. 18 and FIG. 19, the threshold management table T2 and the frequency of use management table T5 stored in the data area of the storage unit 20 are respectively explained.

FIG. 18 illustrates an example of the threshold management table T2 in the present embodiment 2. As illustrated in FIG. 18, the threshold management table T2 in the present embodiment 2 is a table in which the values of the respective thresholds Sk are managed, and furthermore, an update flag which is set when the thresholds Sk are updated is associated.

The update flag is a flag which indicates whether or not the thresholds Sk have been updated as described above, and which is changed by the link management unit 32 to the value "1" indicating that the thresholds Sk have been updated, when the link management unit 32 updates the thresholds Sk. Then, when the Hello frame generating unit 35 generates a Hello frame that includes updated thresholds Sk (described in detail later) and transmits it to adjacent node apparatuses 1, the update flag is initialized by the Hello frame generating unit 35 and changed again to "0".

FIG. 19 illustrates an example of the frequency of use management table T5 in the present embodiment 2. The frequency of use management table T5 in the present embodiment 2 is a table that manages the frequency of use FU (i) of a link with an adjacent node apparatus 1, that is, the number of times for which the adjacent node apparatus 1 that constitutes the link was the forwarding destination (LD) of transmission of frames. The frequency of use management table T5 in the present embodiment 2 is a table that includes, for each adjacent node apparatus 1 with which a link exists, the arrival rate i in the link, the frequency of use FU(i), and a flag for the link, as illustrated in FIG. 19.

The frequency of use FU(i) is the number of times for which the link of the corresponding arrival rate i was used in forwarding data frames, and it is incremented each time the corresponding adjacent node apparatus 1 is selected as the forwarding destination by the data frame processing unit 33.

The flag is a flag that indicates whether or not the corresponding arrival rate i is the latest arrival rate i in the link with the corresponding adjacent node apparatus 1, and the flag value "1" indicates that the corresponding arrival rate i is the latest arrival rate i.

Returning to FIG. 17, the functions served respectively by the link management unit 32, the data frame processing unit 33 and the Hello frame generating unit 35 in the present embodiment 2, mainly in terms of differences compared with embodiment 1, are explained.

The link management unit 32 further manages the threshold management table T2. More specifically, the link management unit 32 analyzes a received Hello frame, and when thresholds Sk are included in the Hello frame, updates thresholds Sk registered in threshold management table T2 respectively with the thresholds Sk included in the Hello frame. Then, the link management unit 32 changes the value of the update flag in the threshold management table T2 to "1".

In addition, the link management unit 32 manages the frequency of use management table T5. More specifically, the link management unit 32 associates the arrival rate i calculated in the process of calculating the link cost $C_{Link}$ with the corresponding adjacent node apparatus 1 and stores them in the frequency of use management table T5, and also stores the initial value "0" in the corresponding field of the frequency of use FU(i). Then, the link management unit 32 initializes the flag value of the corresponding adjacent node apparatus 1, and changes the flag value corresponding to the stored latest arrival rate i to "1".

Further, at a prescribed timing (for example, regularly), the data frame processing unit 33 refers to the frequency of use management table T5, generates a data frame that includes frequency of use information representing the registered content in the frequency of use management table T5 as the payload, and transmits it with the GW apparatus 1 as its final destination (GD). Then, the data frame processing unit 33 initializes the frequency of use management table T5. The frequency of use information in the present embodiment 2 is information in which the arrival rate i and the frequency of use FU(i) are associated.

In addition, when the data frame is forwarded to the adjacent node apparatus 1, the data frame processing unit 33 increments the corresponding frequency of use FU(i) in the frequency of use management table T5. More specifically, the data frame processing unit 33 refers to the frequency of use management table T5 to identify the frequency of use FU(i) whose corresponding flag value is "1" among frequencies of use FU(i) corresponding to the adjacent node apparatus 1 selected as the forwarding destination (LD), and increments the identified frequency of use FU(i).

At a prescribed timing (for example, regularly), the Hello frame generating unit 35 generates a Hello frame with a header illustrated in FIG. 20 described later, and transmits the generated Hello frame to the adjacent node apparatuses 1, via the communication unit 10. At this time, the Hello frame generating unit 35 refers to the routing table T4 to identify, for each of the registered GDs in the routing table T4, the minimum route cost $C_{Route}$ among route costs $C_{Route}$ for the adjacent node apparatuses 1 corresponding to the GD, associates the identified route cost $C_{Route}$ with the node ID of the GD, and stores them respectively in the Hello frame. In addition, the Hello frame generating unit 35 refers to the threshold management table T2, and when the flag value of the update flag is "1", obtains the thresholds Sk registered in the threshold management table T2 and stores the obtained thresholds Sk in the Hello frame. Then, the Hello frame generating unit 35 initializes the update flag in the threshold management table T2.

Here, referring to FIG. 20 and FIG. 21, the format of the header of the Hello frame in the present embodiment 2 is explained. FIG. 20 illustrates a format example for the header of the Hello frame in the present embodiment 2, and FIG. 21 gives a description of each field in the format example illustrated in FIG. 20.

The header of the Hello frame in the present embodiment 2 includes the transmission-source ID, the FID, the frame type, pairs comprising the GD and the route cost $C_{Route}$, and the thresholds Sk, as illustrated in FIG. 20.

The thresholds Sk are the updated thresholds Sk stored when the thresholds Sk are updated, and when the thresholds Sk have not been updated, NULL is stored.

FIG. 22 is a functional block diagram illustrating a configuration example of the node apparatus 1 that functions as the GW apparatus 1 in the present embodiment 2. The basic configuration of the GW apparatus 1 in the present embodiment 2 is the same as the configuration of the normal node apparatus 1.

However, there is a difference compared with the normal node apparatus 1 in that the control unit 30 of the GW apparatus 1 in the present embodiment 2 is further equipped with a frequency of use management unit 37 and a threshold calculating unit 38, as illustrated in FIG. 22. In addition, there is a difference compared with the normal node apparatus 1 in that the storage unit 20 of the GW apparatus 1 in the present embodiment 2 further stores a table for usage rate calculation T6 in the data area, as illustrated in FIG. 22.

Here, referring to FIG. 23, the table for usage rate calculation T6 stored in the data area of the storage unit 20 is explained. FIG. 23 illustrates an example of the table for usage rate calculation T6 in the present embodiment 2. The table for usage rate calculation T6 in the present embodiment 2 is a table in which, for each arrival rate i, the frequency of use FU(i) and the usage rate UR(i) are associated, as illustrated in FIG. 23.

The arrival rate i is the arrival rate i of unicast frames in each link collected from each node apparatus 1 under the GW apparatus 1. The frequency of use FU(i) is the frequency of use FU(i) of the link with the corresponding arrival rate i, and the frequency of use FU(i) of the link collected from each node apparatus 1 under the GW apparatus 1. The usage rate UR(i) is the usage rate of the link with the corresponding arrival rate i, and is calculated and stored by the threshold calculating unit 38.

Returning to FIG. 22, upon receiving a data frame that includes frequency of use information as the payload and that is addressed to the local GW apparatus 1, the frequency of use management unit 37 associates the arrival rate i and the frequency of use FU(i) and stores them in the table for usage rate calculation T6. At this time, when an entry corresponding to the arrival rate i already exists, the frequency of use management unit 37 integrates the frequency of use FU(i) of the entry by the corresponding frequency of use FU(i) in the data frame. On the other hand, when an entry corresponding to the arrival rate i does not exist, the frequency of use management unit 37 adds an entry, associates the arrival rate i and the frequency of use FU(i), and stores them in the table for usage rate calculation T6.

At a prescribed timing (for example, regularly), the threshold calculating unit 38 refers to the table for usage rate calculation T6, and calculates the usage rate UR(i) for each registered arrival rate i according to the frequency of use FU(i). Then, the threshold calculating unit 38 updates the corresponding usage rates UR(i) in the table for usage rate calculation T6 respectively with the calculated usage rates UR(i).

The threshold calculating unit 38 then calculates the thresholds Sk that minimize the estimated metric $M_E$ defined in Formula 1 mentioned above, according to the arrival rate i and the corresponding updated usage rate UR(i). Then, the threshold calculating unit 38 instructs the Hello frame generating unit 35 to generate a Hello frame that includes the calculated thresholds Sk. In response, the Hello frame generating unit 35 generates and transmits a Hello frame with a header illustrated in FIG. 20 that stores the thresholds Sk calculated by the threshold calculating unit 38. Accordingly, it becomes possible for each node apparatus 1 under the GW apparatus 1 to update the thresholds Sk stored in the threshold management table T2.

Next, referring to FIG. 24, the flow of a forwarding process in the present embodiment 2 is explained. FIG. 24 is an example of a flowchart for explaining the forwarding process in the present embodiment 2. The forwarding process is a process corresponding to the process in step S005 in the frame reception process explained in embodiment 1.

The data frame processing unit 33 analyzes the header of a received data frame, and judges whether or not the LD matches the local node ID (step S101).

When judging that the LD does not match the local node ID (step S101: NO), the data frame processing unit 33 discards the received data frame (step S102). Then, this process is terminated.

On the other hand, when judging that the LD matches the local node ID (step S101: YES), the data frame processing unit 33 instructs the ACK frame processing unit 36 to generate an ACK frame (step S103). Then, the ACK frame processing unit 36 generates an ACK frame, and transmits the generated ACK frame to the transmission-source node apparatus 1 (LS) via the communication unit 10 (step S104).

The data frame processing unit 33 then judges whether or not the GD matches the local node ID (step S105). That is, the data frame processing unit 33 judges whether or not the final destination of the received data frame is the local node apparatus 1.

When judging that the GD matches the local node ID (step S105: YES), the data frame processing unit 33 outputs the received data frame to the upper layer, and the upper layer performs processing of the received data frame, in response to the input of the data frame (step S106). Then, this process is terminated.

On the other hand, when judging that the GD does not match the local node ID (step S105: NO), the data frame processing unit 33 instructs the route selecting unit 34 to select the LD (step S107).

On receiving the instruction for selecting the LD, the route selecting unit 34 identifies the routing table T4 corresponding to the GD of the forwarding-object data frame (step S108), and selects the LD so as to minimize the route cost $C_{Route}$ to the GD (step S109). Then, the route selecting unit 34 reports the selected LD to the data frame processing unit 33 (step S110).

The data frame processing unit 33 that has received the report of the selected LD performs setting of the header (step S111), and forwards the data frame to the adjacent node apparatus 1 that is the LD selected by the route selecting unit 34, via the communication unit 10 (step S112). Then, this process is terminated.

The data frame processing unit 33 then refers to the frequency of use management table T5 to identify the frequency of use FU(i) whose corresponding flag value is "1" among frequencies of use FU(i) corresponding to the adjacent node apparatus 1 selected as the forwarding destination (LD) (step S113), and increments the identified frequency of use FU(i) (step S114). Then, this process is terminated.

Figure 25:
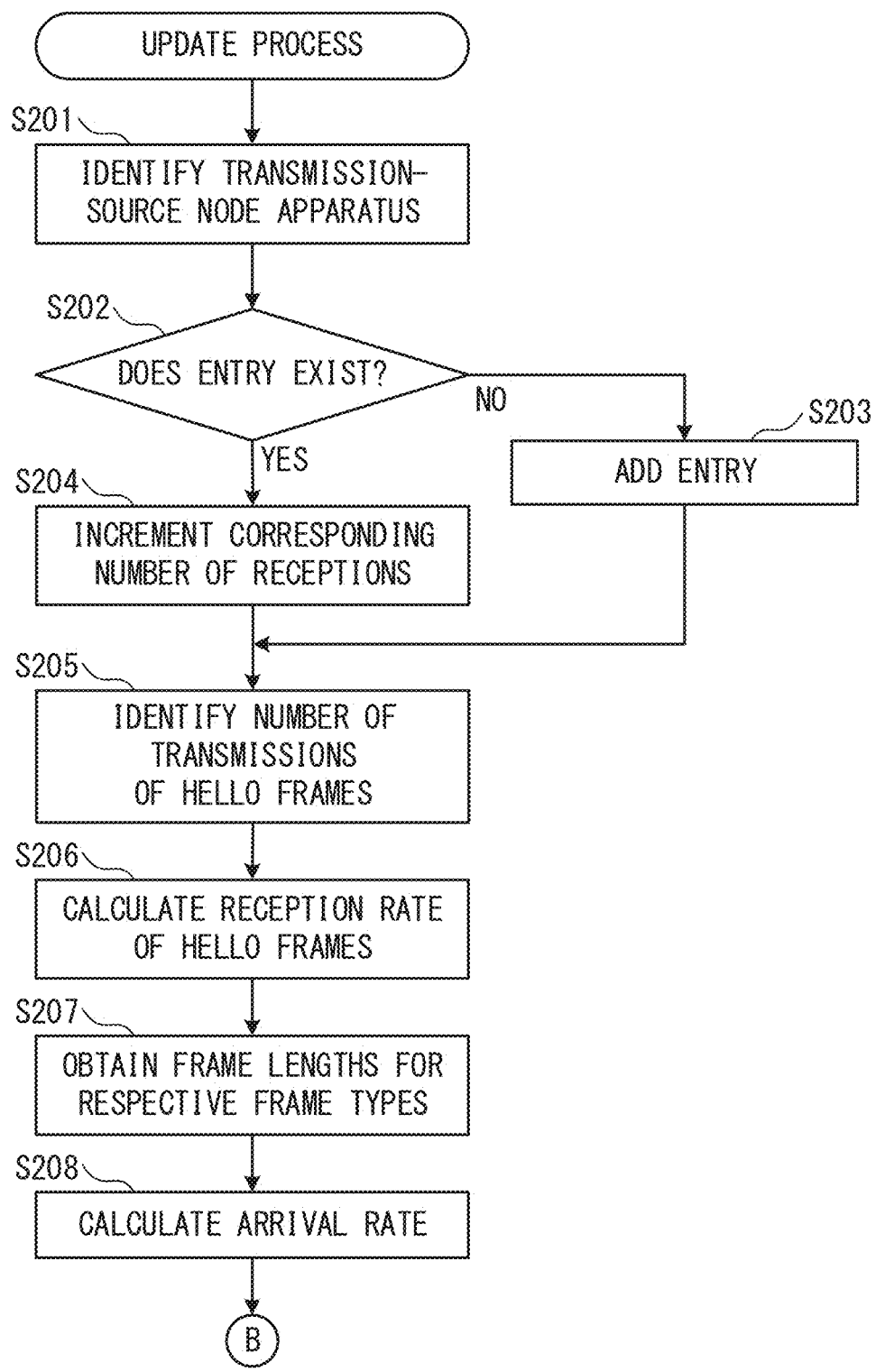
FIG. 25 is a portion of an example of a flowchart for explaining the flow in an update process in embodiment 2.
Figure 26:
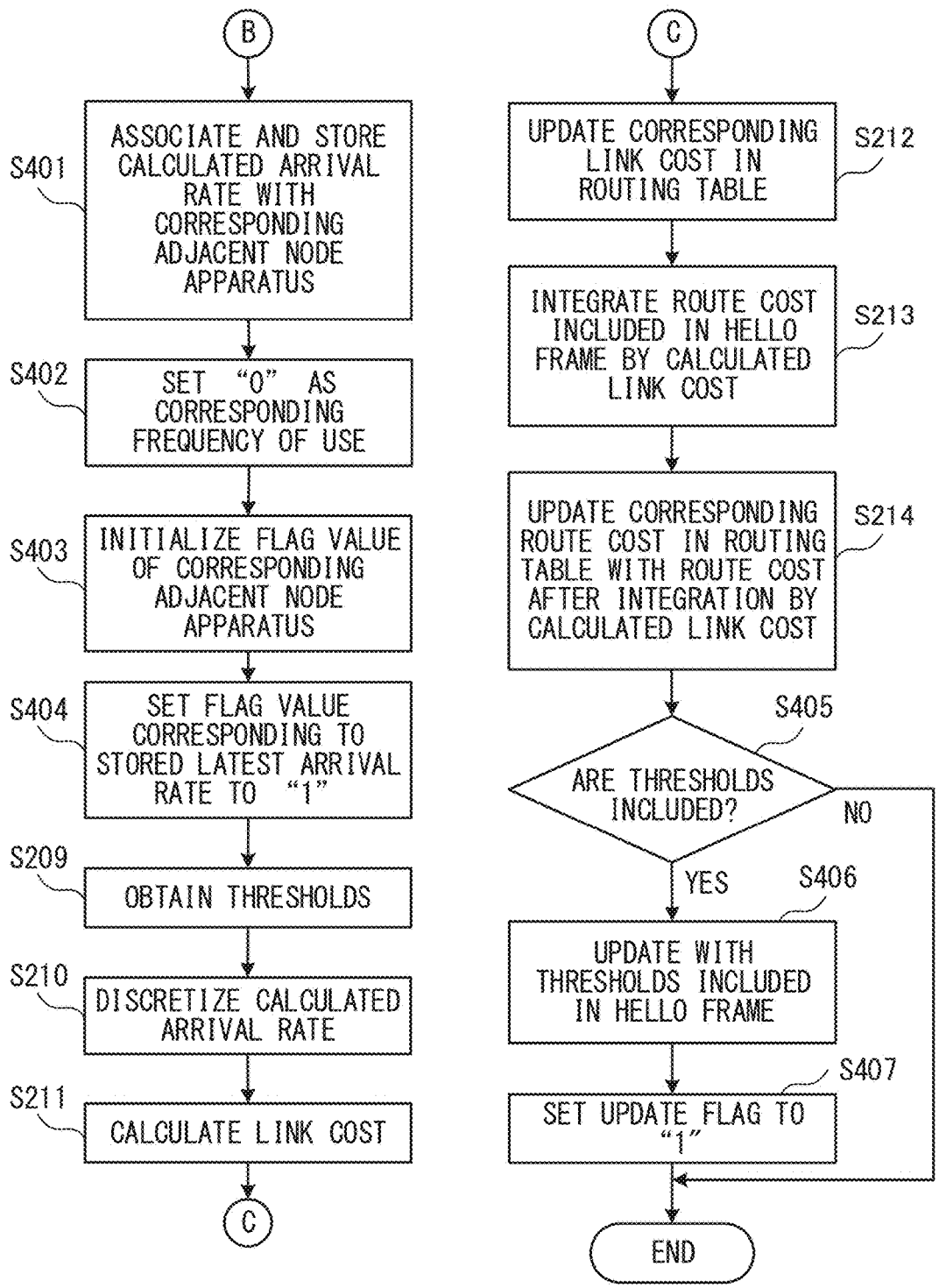
FIG. 26 is another portion of an example of a flowchart for explaining the flow in an update process in embodiment 2.

Next, referring to FIG. 25 and FIG. 26, the flow of an update process in the present embodiment 2 is explained. FIG. 25 and FIG. 26 are a portion and another portion of an example of a flowchart for explaining the flow of the update process in the present embodiment 2, respectively. The update process is a process corresponding to the process in step S009 in the frame reception process described in embodiment 1.

The link management unit 32 analyzes a received Hello frame to identify the adjacent node apparatus 1 that is the transmission source of the Hello frame (step S201), and judges whether or not an entry for the identified adjacent node apparatus 1 exists in the number of receptions management table T3 (step S202).

When judging that an entry for the identified adjacent node apparatus 1 does not exist (step S202: NO), the link management unit 32 adds an entry, associates the transmission-source ID and the number of receptions "1", and stores them in the number of receptions management table T3 (step S203). Then, the process proceeds to the process in step S205 described later.

On the other hand, when judging that an entry for the identified adjacent node apparatus 1 exists (step S202: YES), the link management unit 32 increments the number of receptions corresponding to the identified adjacent node apparatus 1 (step S204).

Then, the link management unit 32 identifies the number of transmissions of Hello frames in the transmission-source node apparatus 1 based on the FID of the received Hello frame (step S205). The link management unit 32 then calculates the reception rate of Hello frames according to the incremented number of receptions and the identified number of transmissions (step S206), and also refers to the frame length management table T1 to obtain the frame lengths ($L_D$, $L_A$, $L_H$) for the respective frame types (step S207).

Then, the link management unit 32 calculates the arrival rate i of unicast frames in the link with the node apparatus 1 that is the transmission source of the received Hello frame, according to the calculated reception rate of Hello frames and the obtained frame lengths for the respective frame types and using Formula 13 mentioned above (step S208).

The link management unit 32 then associates the calculated arrival rate i and the corresponding adjacent node apparatus 1, and stores them in the frequency of use management table T5 (step S401), and also stores the initial value "0" in the field of the corresponding frequency of use FU(i) (step S402). Then, the link management unit 32 initializes the flag value of the corresponding adjacent node apparatus 1 (step S403), and changes the flag value corresponding to the stored latest arrival rate i to "1" (step S404).

The link management unit 32 then refers to the threshold management table T2 to obtain the thresholds Sk (step S209), and discretizes the calculated arrival rate i according to the obtained thresholds Sk (step S210).

Then, the link management unit 32 calculates the reciprocal of the value $i_S$ after the discretization as the link cost $C_{Link}$ (step S211), and updates the link cost $C_{Link}$ corresponding to the identified adjacent node apparatus 1 in the routing table T4 (step S212). At this time, when no entry for the identified adjacent node apparatus 1 exists in the routing table T4, or when no entry for the identified adjacent node apparatus 1 exists in a part of the GDs associated with the route costs $C_{Route}$ included in the Hello frame, the link management unit 32 adds an entry, and stores the calculated link cost $C_{Link}$ in the corresponding field.

The link management unit 32 then integrates the respective route costs $C_{Route}$ included in the received Hello frame by the calculated link cost $C_{Link}$, to calculate the route cost $C_{Route}$ to the local node apparatus 1 (step S213).

Then, the link management unit 32 updates the corresponding route costs $C_{Route}$ in the routing table T4 with the route costs $C_{Route}$ after the integration of the respective route costs $C_{Route}$ included in the received Hello frame by the calculated link cost $C_{Link}$ (step S214).

The link management unit 32 then judges whether or not the thresholds Sk are included in the received Hello frame (step S405). When the link management unit 32 judges that no thresholds Sk are included (step S405: NO), the process is terminated.

On the other hand, when judging that the thresholds Sk are included (step S405: YES), the link management unit 32 updates the thresholds Sk registered in the threshold management table T2 respectively with the thresholds Sk included in the Hello frame (step S406). Then, the link management unit 32 changes the value of the update flag in the threshold management table T2 to "1" (step S407), and the process is terminated.

Next, referring to FIG. 27, the flow of a Hello frame generation process in the present embodiment 2 is explained. FIG. 27 is an example of a flowchart for explaining the Hello frame generation process in the present embodiment 2. The Hello frame generation process starts with the arrival of a prescribed timing as a trigger.

The Hello frame generating unit 35 judges whether or not the prescribed timing has arrived (step S301). When the Hello frame generating unit 35 judges that the prescribed timing has not arrived yet (step S301: NO), the process in step S301 is repeated to wait for the arrival of the prescribed timing.

On the other hand, when judging that the prescribed timing has arrived (step S301: YES), the Hello frame generating unit 35 refers to the routing table T4 to identify, for each registered GD in the routing table T4, the minimum route cost $C_{Route}$ among the route costs $C_{Route}$ of the adjacent node apparatuses 1 corresponding to the GD (step S302).

Then, the Hello frame generating unit 35 refers to the threshold management table T2 and judges whether or not the flag value of the update flag is "1" (step S501). When judging that the flag value of the update flag is not "1" (step S501: NO), the Hello frame generating unit 35 generates a Hello frame that includes pairs comprising the node ID of the corresponding GD and the identified route cost $C_{Route}$ (step S303). Then, the process proceeds to the process in step S304.

On the other hand, when judging that the flag value of the update flag is "1" (step S501: YES), the Hello frame generating unit 35 obtains the thresholds Sk registered in threshold management table T2 (step S502), and generates a Hello frame that includes pairs comprising the node ID of the corresponding GD and the identified route cost $C_{Route}$, and the obtained thresholds Sk (step S503). Then, the Hello frame generating unit 35 initializes the update flag in the threshold management table T2 (step S504).

The Hello frame generating unit 35 then transmits the generated Hello frame to the adjacent node apparatus 1 via the communication unit 10 (step S304). Then, the process returns to the process in step S301, and the process described above is repeated.

Next, referring to FIG. 28, the flow of a generation process for a data frame that includes frequency of use information as the payload is explained. FIG. 28 is an example of a flowchart for explaining the flow of the data frame generation process in the present embodiment 2. The data frame generation process starts with the arrival of a prescribed timing as a trigger.

The data frame processing unit 33 judges whether or not the prescribed timing has arrived (step S601). When the data frame processing unit 33 judges that the prescribed timing has not arrived yet (step S601: NO), the process in step S601 is repeated to wait for the arrival of the prescribed timing.

On the other hand, when judging that the prescribed timing has arrived (step S601: YES), the data frame processing unit 33 refers to the frequency of use management table T5 and generates a data frame that includes frequency of use information as the payload, and transmits it with the GW apparatus 1 as the final destination (GD) (step S602). Then, the data frame processing unit 33 initializes the frequency of use management table T5 (step S603), the process returns to the process in step S601, and the process described above is repeated.

Next, referring to FIG. 29, a threshold calculation process performed in the GW apparatus 1 is explained. FIG. 29 is an example of a flowchart for explaining the threshold calculation process executed in the GW apparatus 1 in the present embodiment 2. The threshold calculation process starts with the arrival of a prescribed timing as a trigger.

The threshold calculating unit 38 judges whether or not the prescribed timing has arrived (step S701). When the threshold calculating unit 38 judges that the prescribed timing has not arrived yet (step S701: NO), the process in step S701 is repeated to wait for the arrival of the prescribed timing.

On the other hand, when judging that the prescribed timing has arrived (step S701: YES), the threshold calculating unit 38 refers to the table for usage rate calculation T6, and calculates the usage rate UR(i) for each registered arrival rate i according to the frequency of use FU(i) (step S702). Then, the threshold calculating unit 38 updates the corresponding usage rates UR(i) in the table for usage rate calculation T6 respectively with the calculated usage rate UR(i) (step S703).

The threshold calculating unit 38 then calculates the thresholds Sk that minimize the estimated metric $M_E$ defined in Formula 1 mentioned above, according to the arrival rate i and the corresponding updated usage rate UR(i) (step S704), and instructs the Hello frame generating unit 35 to generate a Hello frame that includes the calculated thresholds Sk (step S705).

In response, the Hello frame generating unit 35 generates and transmits a Hello frame that stores the thresholds Sk calculated by the threshold calculating unit 38 (step S706). Then, the process returns to the process in step S701, and the process described above is repeated.

According to embodiment 2 described above, the node apparatus 1 that functions as the GW apparatus 1 collects frequency of use information from each node apparatuses 1 under the GW apparatus 1, calculates the thresholds Sk according to the collected frequency of use information, and reports the calculated thresholds Sk to the node apparatuses 1 under the GW apparatus 1. Then, each of the node apparatuses 1 under the GW apparatus 1 updates the thresholds Sk in the threshold management table T2 with the reported thresholds Sk. By so doing, it becomes possible to continue to maintain a more suitable route while suppressing the occurrence of loop routes.

In embodiments 1 and 2 described above, an explanation is given according to which the arrival rate i is calculated according to the reception rate of Hello frames and the frame lengths for the respective frame types, but this is not a limitation, and the arrival rate i may be calculated using another method. For example, data frames may be transmitted to an adjacent node apparatus 1, and the arrival rate i of unicast frames may be calculated according to the number of transmissions of data frames and the number of receptions of ACK frames from the transmission-destination adjacent node apparatus 1. At this time, a dedicated frame for measurement may be used for calculating the arrival rate i.

In addition, the arrival rate i of unicast frames may also be calculated by measuring the reception electric field strength at both of the adjacent node apparatuses 1 that constitute a link, and by calculating the reception rate of data frames and the reception rate of ACK frames according to the reception electric field strength.

For example, referring to FIG. 1, the node apparatus N2 is assumed to be the transmission source (LS), and the node apparatus N1 is assumed to be the transmission destination (LD), of data frames. In this case, the node apparatus N1 which is the transmission destination (LD) calculates the reception rate of data frames according to the measured reception electric field strength, includes the calculated reception rate of data frames in an ACK frame for example, and transmits it to the node apparatus N2 which is the transmission source (LS). The node apparatus N2 which is the transmission source (LS) calculates the reception rate of ACK frames according to the reception electric field strength, and calculates the arrival rate i of unicast frames in the link with the adjacent node apparatus 1, by multiplying the reception rate of data frames included in the received ACK frame by the calculated reception rate of ACK frames. Meanwhile, the reception rate of data frames or ACK frames may be calculated according to an SNR (Signal to Noise Ratio) calculated according to the measured reception electric field strength.

In embodiments 1 and 2 described above, an explanation is given according to which the arrival rate i of unicast frames is calculated according to the reception rate of Hello frames and the frame lengths for the respective frame types, but this is not a limitation, and the arrival rate i of unicast frames may be calculated according to the reception rate of data frames (or, the reception rate of ACK frames) and the frame lengths for the respective frame types.

For example, it is possible to calculate the reception rate of 1-bit data in one direction according to the reception rate of data frames and the frame length $L_D$ of the data frame. Therefore, it is possible to calculate the arrival rate i of unicast frames according to the reception rate of data frames. In this case, this may be done by making the data frame include the number of transmissions of data frames to the transmission-destination adjacent node apparatus 1. However, Hello frames are transmitted regularly, and therefore, it is possible to regularly calculate the link cost $C_{Link}$. Therefore, it is preferable to calculate the link cost $C_{Link}$ according to the reception rate of Hello frames.

In embodiments 1 and 2 described above, an explanation is given according to which the frame lengths of the respective frame types are fixed, but this is not a limitation, and in a case in which the frame lengths are variable, the link cost $C_{Link}$ may be calculated assuming the maximum frame lengths available in the wireless system used as the frame length of the respective frame types. In addition, the average value of the frame length of each frame type may be calculated respectively, and the link cost $C_{Link}$ may be calculated using the calculated average values.

In embodiments 1 and 2 described above, an explanation is given according to which the estimated metric $M_E$ is defined by Formula 1. However, this is not a limitation, and the estimated metric $M_E$ may be defined by Formula 14 below using the frequency of use FU(i) instead of the usage rate UR(i), because the frequency of use FU (i) is proportional to the usage rate UR(i).

$$M_E = \sum_{i \in I} \{(SCORE_s(i) - SCORE(i)) \times FU(i)\} \quad \text{[FORMULA 14]}$$

In embodiment 2 described above, an explanation is given according to which the GW apparatus 1 (in FIG. 1, the node apparatus N1 as described above) calculates the thresholds Sk and reports the calculated thresholds Sk to each node apparatus 1 under the GW apparatus 1. However, this is not a limitation, and the GW apparatus 1 may report correspondence information in which the arrival rate i and the usage rate UR(i) in the frequency of use management table T6 are associated, that is, the probability distribution in the case in which the arrival rate i is assumed to be a random variable to each node apparatus 1 under the GW apparatus 1, and each node apparatus 1 under the GW apparatus 1 may calculate the threshold Sk.

Figure 30:
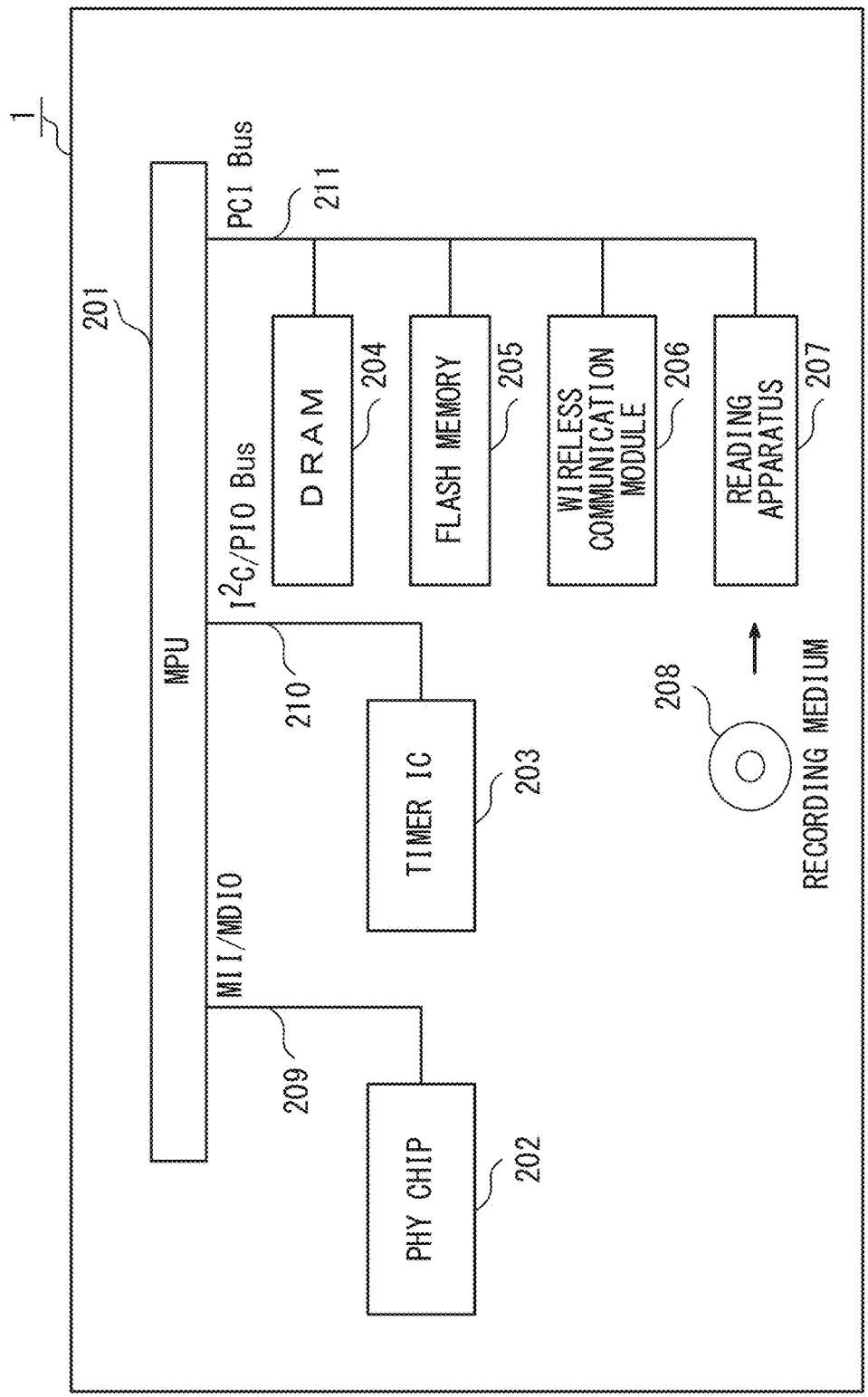
FIG. 30 is a diagram illustrating an example of the hardware configuration of a node apparatus in each embodiment.

FIG. 30 illustrates an example of the hardware configuration of the node apparatus 1 in the embodiments. The node apparatus 1 illustrated in FIG. 3 and so on may be realized by various pieces of hardware illustrated in FIG. 30, for example. In the example in FIG. 30, the node apparatus 1 is equipped with an MPU 201, a PHY (PHYsical layer) chip 202, and a timer IC (Integrated Circuit) 203. In addition, the node apparatus 1 is equipped with a DRAM (Dynamic Random Access Memory) 204, a flash memory 205, a wireless communication module 206, and a reading apparatus 207.

The communication interface that connects the MPU 201 and the PHY chip 202 is an MII/MDIO (Media Independent Interface or Management Data Input/Output) 209. The MII and the MDIO are both an interface between the physical layer and the MAC (Media Access Control) sublayer. The MPU 201 and the timer IC 203 are connected via an I²C/PIO (Inter-Integrated Circuit or Parallel Input/Output) bus 210, and the DRAM 204, the flash memory 205, the wireless communication module 206 and the reading apparatus 207 are connected to the MPU 201 via a PCI (Peripheral Component Interconnect) bus 211.

The MPU 201 loads an operation program stored in the flash memory 205, which is a kind of a non-volatile storage apparatus, into the DRAM 204, and executes various processes while using the DRAM 204 as working memory. The MPU 201 may implement the respective functional units of the control unit 30 illustrated in FIG. 3 and so on, by executing the operation program.

The operation program for executing the above operations may be stored and distributed in a computer-readable recording medium 208 such as a flexible disk, a CD-ROM (Compact Disk-Read Only Memory), a DVD (Digital Versatile Disk), or an MO (Magneto Optical disk), and the processes described above may be executed by reading it by means of the reading apparatus 207 of the node apparatus 1 and installing it in the computer. In addition, the operation program may be stored in a disk apparatus or the like of a server apparatus on the Internet, and downloading of the operation program to the computer of the node apparatus 1, or the like, may be performed via the PHY chip 202 or the wireless communication module 206.

Also, a storage apparatus of a type other than the DRAM 204 and the flash memory 205 may be used, depending on the embodiment. For example, the node apparatus 1 may be equipped with a storage apparatus such as a CAM (Content Addressable Memory), an SRAM (Static Random Access Memory), an SDRAM (Synchronous Dynamic Random Access Memory), or the like.

The frame length management table T1, the threshold management table T2, the number of receptions management table T3, the routing table T4, the frequency of use management table T5, and the table for usage rate calculation T6 illustrated in FIG. 3 and so on are realized by means of the DRAM 204, the flash memory 205, or another storage apparatus that is not illustrated in the drawings. The flash memory 205 stores not only the operation program but also the local node ID and so on.

The PHY chip 202 is a circuit which performs processing in the physical layer in wired connection. When the network 100 is a wireless network, the node apparatus 1 does not have to be equipped with the PHY chip 202. However, the node apparatus 1 may be equipped with the PHY chip 202 for connection between the node apparatus 1 and an external network.

For example, the node apparatus 1 may be equipped with a wired LAN port which is compliant with the Ethernet (registered trademark) standard, and may be connected to a GW apparatus or the like in an external network via a cable connected to the wired LAN port.

In this case, the MPU 201 may generate an Ethernet frame and output it to the PHY chip 202 via the MII/MDIO 209. Then, the PHY chip 202 converts the output from the MPU 201 (that is, a logic signal representing the Ethernet frame) into a signal according to the type of the cable (that is, an electrical signal or an optical signal), and outputs this signal to the cable. Thus, the node apparatus 1 may transmit data (for example, a frame) to the external network using the PHY chip 202.

Also, the PHY chip 202 may convert an electrical signal or an optical signal which is input from the external network via the cable and the wired LAN port into a logic signal, and may output this signal to the MPU 201 via the MII/MDIO 209. Thus, the node apparatus 1 may receive data (for example, a frame) from the external network using the PHY chip 202.

The timer IC 203 is a circuit which performs a count-up operation until a set time elapses, and which outputs an interrupt signal when the set time elapses.

The wireless communication module 206 is hardware which performs processing in the physical layer in wireless communication. The wireless communication module 206 includes, for example, an antenna, an ADC (Analog-to-Digital Converter), a DAC (Digital-to-Analog Converter), a modulator, a demodulator, an encoder, a decoder, and so on.

The hardware configuration of the node apparatus 1 may be different from that in FIG. 30 depending on the embodiment, and it is also possible to apply other hardware of a standard/type which is different from the standard/type illustrated in FIG. 30 to the node apparatus 1.

For example, the respective functional units of the control unit 30 illustrated in FIG. 3 and so on may be realized by means of a hardware circuit. Specifically, the respective functional units of the control unit 30 illustrated in FIG. 3 and so on may be realized by means of a reconfigurable circuit such as an FPGA (Field Programmable Gate Array) or an ASIC (Application Specific Integrated Circuit), or the like, instead of the MPU 201. Of course, these functional units may also be realized by means of both the MPU 201 and a hardware circuit.

Some embodiments have been described above. However, embodiments are not limited to the embodiments described above, and it should be understood that embodiments include various modified forms and alternative forms of the embodiments described above. For example, it is to be understood that various embodiments may take form with constituent elements being modified without departing from their sprit and scope. In addition, it is to be understood that various embodiments may be made by appropriately combining a plurality of constituent elements disclosed in the embodiments described above. Furthermore, it is to be understood by persons skilled in the art that various embodiments may be implemented while deleting or replacing some constituent elements among the entirety of constituent elements illustrated in the embodiments, or while adding some constituent elements to the constituent elements illustrated in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that various changes, substitutions, and alterations could be made hereto without departing from the spirit and scope of the invention.

What is claimed is:

1. A route selecting method for a node apparatus, the route selecting method comprising:
    calculating by a processor an arrival rate which is a value obtained by multiplying a reception rate in an outward route in a link by a reception rate in an inward route in the link, the link being established between the node apparatus and an adjacent node apparatus which is adjacent to the node apparatus;
    discretizing by the processor the calculated arrival rate according to a plurality of thresholds set for an arrival rate in advance;
    calculating by the processor a link cost in the link with the adjacent node apparatus according to a value after discretization of the arrival rate;
    obtaining by the processor, from the adjacent node apparatus, a route cost which is an integrated value of link costs of links on a route, for each route to each final-destination node apparatus that may be reached from the adjacent node apparatus;
    calculating by the processor a route cost in a route to each final-destination node apparatus that may be reached from the local node apparatus via the adjacent node apparatus by integrating the obtained route cost by the calculated link cost; and
    when transmitting a data frame, selecting by the processor the adjacent node apparatus to be a transmission destination of the data frame which is a transmission object according to the route cost of a route from the local node apparatus to a node apparatus which is a final destination of the data frame which is the transmission object, wherein
    the higher a frequency of usage of the link is, the narrower an interval between adjacent two values among the plurality of thresholds used in the discretization for the link is set.

2. The route selecting method for the node apparatus according to claim 1, wherein
    the thresholds are thresholds that approximately minimize a value obtained by obtaining, for the respective calculated arrival rates, a multiplied value which is a value obtained by multiplying a difference between a reciprocal of the value after the discretization of the calculated arrival rate and a reciprocal of the calculated arrival rate by the frequency of usage of the link, and by integrating the multiplied values obtained for the respective calculated arrival rates.

3. The route selecting method for the node apparatus according to claim 1, wherein the route selecting method further comprising:
    updating by the processor the thresholds at a prescribed timing.

4. The route selecting method for the node apparatus according to claim 1, wherein
    the link cost in the link with the adjacent node apparatus is a reciprocal of the value after discretization of the arrival rate.

5. The route selecting method for the node apparatus according to claim 1, wherein
    the calculating the arrival rate calculates a reception rate of frames of a specific frame type transmitted from the adjacent node apparatus and calculates the arrival rate according to the reception rate and frame lengths of respective frame types.

6. The route selecting method for the node apparatus according to claim 5, wherein
    frames of the specific frame type are Hello frames.

7. A node apparatus comprising
    a processor configured to execute a process including:
    calculating an arrival rate which is a value obtained by multiplying a reception rate in an outward route in a link by a reception rate in an inward route in the link, the link being established between the node apparatus and an adjacent node apparatus which is adjacent to the node apparatus;
    discretizing the calculated arrival rate according to a plurality of thresholds set for an arrival rate in advance;
    calculating a link cost in the link with the adjacent node apparatus according to a value after discretization of the calculated arrival rate;
    obtaining, from the adjacent node apparatus, a route cost which is an integrated value of link costs of links on a route, for each route to each final-destination node apparatus that may be reached from the adjacent node apparatus;
    calculating a route cost in a route to each final-destination node apparatus that may be reached from the local node apparatus via the adjacent node apparatus by integrating the obtained route cost by the calculated link cost; and
    when transmitting a data frame, selecting the adjacent node apparatus to be a transmission destination of the data frame which is a transmission object according to the route cost of a route from the local node apparatus to a node apparatus which is a final destination of the data frame which is the transmission object, wherein the higher a frequency of usage of the link is, the narrower an interval between adjacent two values among the plurality of thresholds used in the discretization for the link is set.

8. The node apparatus according to claim 7, wherein the thresholds are thresholds that approximately minimize a value obtained by obtaining, for the respective calculated arrival rates, a multiplied value which is a value obtained by multiplying a difference between a reciprocal of the value after the discretization of the calculated arrival rate and a reciprocal of the calculated arrival rate by the frequency of usage of the link, and by integrating the multiplied values obtained for the respective calculated arrival rates.

9. The node apparatus according to claim 7, wherein the process further includes:
   updating the thresholds at a prescribed timing.

10. The node apparatus according to claim 7, functioning as a gateway apparatus, wherein
    the process further includes:
       obtaining from subordinate node apparatuses, frequency of use information in which the arrival rate in the link and the frequency of use of the link are associated;
       calculating the thresholds according to the obtained use of frequency information; and
       reporting the calculated thresholds to the subordinate node apparatuses.

11. A non-transitory computer-readable recording medium having stored therein a program for causing a computer of a node apparatus to execute a process comprising:

calculating an arrival rate which is a value obtained by multiplying a reception rate in an outward route in a link by a reception rate in an inward route in the link, the link being established between the node apparatus and an adjacent node apparatus which is adjacent to the node apparatus;
   discretizing the calculated arrival rate according to a plurality of thresholds set for an arrival rate in advance;
   calculating a link cost in the link with the adjacent node apparatus according to a value after discretization of the arrival rate;
   obtaining, from the adjacent node apparatus, a route cost which is an integrated value of link costs of links on a route, for each route to each final-destination node apparatus that may be reached from the adjacent node apparatus;
   calculating a route cost in a route to each final-destination node apparatus that may be reached from the local node apparatus via the adjacent node apparatus by integrating the obtained route cost by the calculated link cost; and
   when transmitting a data frame, selecting the adjacent node apparatus to be a transmission destination of the data frame which is a transmission object according to the route cost of a route from the local node apparatus to a node apparatus which is a final destination of the data frame which is the transmission object, wherein
   the higher a frequency of usage of the link is, the narrower an interval between adjacent two values among the plurality of thresholds used in the discretization for the link is set.

* * * * *